United States Patent

Khan et al.

(10) Patent No.: US 10,841,742 B2
(45) Date of Patent: Nov. 17, 2020

(54) SUPPORTING A CONFIGURATION OF A DEVICE

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 11 days.

(21) Appl. No.: 15/738,491

(22) PCT Filed: Jun. 29, 2015

(86) PCT No.: PCT/EP2015/064634
§ 371 (c)(1),
(2) Date: Dec. 20, 2017

(87) PCT Pub. No.: WO2017/000978
PCT Pub. Date: Jan. 5, 2017

(65) Prior Publication Data
US 2018/0192253 A1 Jul. 5, 2018

(51) Int. Cl.
*H04W 4/029* (2018.01)
*H04W 4/80* (2018.01)
(Continued)

(52) U.S. Cl.
CPC ........... *H04W 4/029* (2018.02); *G01S 5/0236* (2013.01); *G01S 5/0252* (2013.01); *H04W 4/80* (2018.02); *G01S 1/042* (2013.01); *G01S 2201/01* (2019.08)

(58) Field of Classification Search
CPC ....... H04W 4/029; H04W 4/80; G01S 5/0252; G01S 5/0236; G01S 1/042; G01S 2201/01
See application file for complete search history.

(56) References Cited

U.S. PATENT DOCUMENTS 8,285,310 B1 * 10/2012 Shrum, Jr. ............ H04W 48/18
455/457
2012/0225663 A1 * 9/2012 Gupta ................... G01S 5/0063
455/456.1

(Continued)

FOREIGN PATENT DOCUMENTS

WO WO 2014/068366 A1 5/2014
WO WO-2014068366 A1 * 5/2014 ............ G01S 1/042
WO WO 2015/024758 A1 2/2015

OTHER PUBLICATIONS

International Search Report and Written Opinion for Application No. PCT/EP2015/064634 dated Mar. 30, 2016, 14 pages.
(Continued)

*Primary Examiner* — George Eng
*Assistant Examiner* — Hung K Du
(74) *Attorney, Agent, or Firm* — Alston & Bird LLP

(57) ABSTRACT

A positioning support device transmits radio signals using at least one default configuration parameter value. A mobile device measures characteristics of the signals at different locations. An apparatus assembles, based on the measured characteristics and indications of the locations of measurement, data which enables a determination of characteristics of radio signals transmitted by the positioning support device, which are expected to be observable at different locations. The apparatus determines in addition at least one adapted configuration parameter value and causes the positioning support device to store the assembled data for future transmissions and to use the at least one adapted configuration parameter value for future transmissions. As a result, the positioning support device transmits radio signals including the stored data using the at least one adapted configuration parameter value.

26 Claims, 10 Drawing Sheets

(51) Int. Cl.
  *G01S 5/02*  (2010.01)
  *G01S 1/04*  (2006.01)

(56) References Cited

U.S. PATENT DOCUMENTS

| | | | |
|---|---|---|---|
| 2013/0150073 A1* | 6/2013 | Jovicic | G01S 5/021 |
| | | | 455/456.1 |
| 2014/0274113 A1 | 9/2014 | Teed-Gillen et al. | |
| 2015/0080024 A1 | 3/2015 | Khorashadi et al. | |
| 2015/0201370 A1* | 7/2015 | Desai | H04W 8/245 |
| | | | 370/254 |
| 2015/0289082 A1* | 10/2015 | Salokannel | G01S 1/042 |
| | | | 455/41.2 |
| 2016/0029338 A1* | 1/2016 | Gandhi | H04W 64/00 |
| | | | 455/456.1 |
| 2016/0078698 A1* | 3/2016 | Moses | G08B 25/14 |
| | | | 340/5.23 |
| 2016/0147211 A1* | 5/2016 | Kore | G05B 19/0426 |
| | | | 700/83 |
| 2016/0161592 A1 | 6/2016 | Wirola et al. | |
| 2016/0316419 A1* | 10/2016 | Shyamalan | H04W 8/005 |

OTHER PUBLICATIONS

*Specification of the Bluetooth Systems, Covered Care Package Version: 4.2*, Bluetooth SIG Proprietary (Dec. 2, 2014); vol. 1, Part A, Architecture, Chapter 1.2, pp. 16-17; vol. 1, Part A, Architecture, Chapter 3.3.2.2, pp. 54-55; vol. 6. Part B. Link Layer Specification, Chaps. 2.1-2.3, pp. 38-42, 54-55

*Indoor Positioning And Navigation For Apps*, Steerpath, Nimble Devices Oy, [online] [retrieved Jun. 24, 2015], Retrieved from the Internet: <URL: http://www.steerpath.com/>. (undated) 14 pages.

\* cited by examiner

SUPPORTING A CONFIGURATION OF A DEVICE

FIELD OF THE DISCLOSURE

The invention relates to the field of positioning and more specifically to supporting a configuration of a device that is able to transmit radio signals, the radio signals enabling mobile devices to determine their position.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

For a first aspect of the invention, an example embodiment of a method comprises transmitting, by a positioning support device, radio signals using at least one default configuration parameter value. The method further comprises obtaining and storing, by the positioning support device, data which enables a determination of characteristics of radio signals transmitted by the positioning support device, wherein the characteristics of radio signals are expected to be observable at different locations. The method further comprises obtaining, by the positioning support device, at least one adapted configuration parameter value. The method further comprises transmitting, by the positioning support device, radio signals including the stored data using the at least one adapted configuration parameter value.

For a second aspect of the invention, an example embodiment of a method comprises, performed by at least one apparatus, obtaining characteristics of radio signals, the radio signals transmitted by a positioning support device using at least one default configuration parameter value and the characteristics of radio signals measured by at least one mobile device at each of a plurality of locations, and obtaining indications of the locations of measurement. The method further comprises assembling, based on the obtained characteristics of radio signals and the obtained indications of the locations of measurement, data which enables a determination of characteristics of radio signals transmitted by the positioning support device, wherein the characteristics of radio signals are expected to be observable at different locations. The method further comprises determining at least one adapted configuration parameter value for the positioning support device. The method further comprises causing the positioning support device to store the assembled data for future transmissions and to use the at least one adapted configuration parameter value for future transmissions.

An example embodiment of a first apparatus for each aspect of the invention comprises means for performing or for causing performance of the actions of any embodiment of the example method presented for the first aspect or the second aspect.

The means of the first apparatus for each aspect of the invention may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit.

An example embodiment of a second apparatus for each aspect of the invention comprises at least one processor and at least one memory including computer program code, the at least one memory and the computer program code configured to, with the at least one processor, cause the apparatus at least to perform the actions of any embodiment of the example method presented for the first aspect or the second aspect, respectively.

Any of the described apparatuses may comprise only the indicated components or one or more additional components.

Moreover an example embodiment of a system is presented, which comprises a plurality of example embodiments of any apparatus of the first aspect. Optionally, the system may comprise in addition one or more example embodiments of any apparatus of the second aspect and/or one or more mobile devices that may desire to determine their own position.

Moreover an example embodiment of a non-transitory computer readable storage medium, in which computer program code is stored, is presented for the first and second aspect of the invention. The computer program code causes an apparatus to perform the actions of any embodiment of the example method presented for the first aspect or the second aspect when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention according to the first aspect or the second aspect, respectively, as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting a configuration of a positioning support device. In certain embodiment, any of the presented apparatuses is an apparatus for supporting a configuration of a positioning support device.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
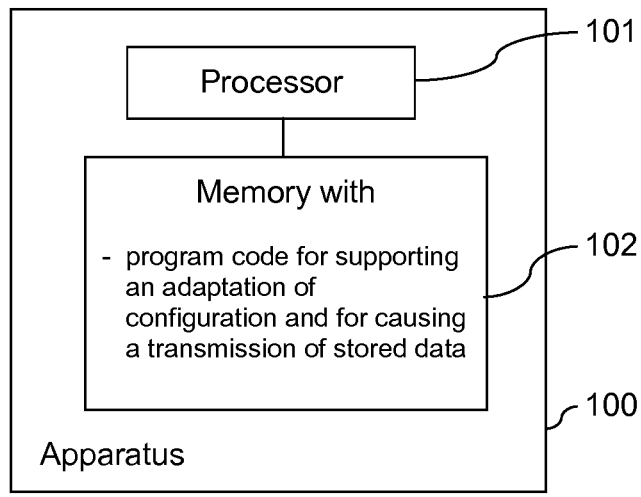
FIG. 1 is a schematic block diagram of an example embodiment of an apparatus according to the first aspect.

FIG. 1 is a schematic block diagram of an example embodiment of an apparatus 100 according to the first aspect of the invention. Apparatus 100 comprises a processor 101 and, linked to processor 101, a memory 102. Memory 102 stores computer program code for supporting an adaptation of a configuration of a positioning support device and for causing a transmission of stored data. The computer program code is an example embodiment of the computer program code according to the first aspect of the invention. Processor 101 is configured to execute computer program code stored in memory 102 in order to cause a positioning support device 100 to perform desired actions.

Apparatus 100 may be a stationary positioning support device. A stationary device is configured to be stationary when in operation and/or fixed to a particular location. A stationary device may be ground based and thus stationary with respect to Earth or only stationary within a particular environment, like a ship. Apparatus 100 may equally be a module, like a chip or circuitry on a chip, for a stationary positioning support device. Optionally, apparatus 100 may comprise various other components, like a radio transmitter or radio transceiver, a further memory, a further processor, etc.

An example operation of the system of FIG. 1 will now be described with reference to the flow chart of FIG. 2. The operation is an example embodiment of a method according to the first aspect of the invention. Processor 101 and the program code stored in memory 102 cause a positioning support device to perform the operation when program code is retrieved from memory 102 and executed by processor 101.

The positioning support device transmits radio signals using at least one default configuration parameter value. (action 111) The at least one default configuration parameter value may be set for example during manufacture, or received for example via the same radio interface via which the radio signals are transmitted, or received for example via another data interface.

The positioning support device furthermore obtains and stores data which enables a determination of characteristics of radio signals transmitted by the positioning support device, wherein the characteristics of radio signals are expected to be observable at different locations. (action 112) The data may be received for example via the same radio interface via which the radio signals are transmitted, or received for example via another data interface. The data may be stored in memory 102 or in another memory of the positioning support device.

The positioning support device furthermore obtains at least one adapted configuration parameter value. (action 113) Adapted configuration parameter values may be received for example via the same radio interface via which the radio signals are transmitted, or received for example via another data interface. In some situations, an obtained adapted configuration parameter value may be the same as the previously used default configuration parameter value.

The positioning support device furthermore transmits radio signals including the stored data using the at least one adapted configuration parameter value. (action 114) The radio signals may be transmitted via the same radio interface as the radio signals that have been transmitted using the at least one default configuration parameter value. It has to be noted that adapted values may be obtained only for some of the required configuration parameters; for any other configuration parameter, the positioning support device may continue using the default value.

Figure 3:
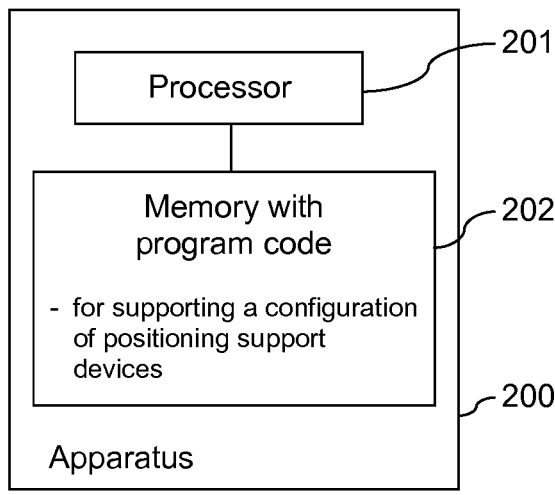
FIG. 3 is a schematic block diagram of an example embodiment of an apparatus according to the second aspect.

FIG. 3 is a schematic block diagram of an example embodiment of an apparatus 200 according to the second aspect of the invention. Apparatus 200 comprises a processor 201 and, linked to processor 201, a memory 202. Memory 202 stores computer program code for supporting a configuration of positioning support devices. The computer program code is an example embodiment of the computer program code according to the second aspect of the invention. Processor 201 is configured to execute computer program code stored in memory 202 in order to cause an apparatus to perform desired actions.

Apparatus 200 may be a mobile device, like a mobile communication device, or a stationary device, like a server. A mobile device is configured to enable operation while the device is moving. Apparatus 200 may equally be a module, like a chip, circuitry on a chip or a plug-in board, for a device. Optionally, apparatus 200 may comprise various other components, like a radio transceiver and/or some other data interface, a user interface, a further memory, a further processor, etc.

An example operation of apparatus 200 will now be described with reference to the flow chart of FIG. 4. The operation is an example embodiment of a method according to the second aspect of the invention. Processor 201 and the program code stored in memory 202 cause an apparatus to perform the operation when program code is retrieved from memory 202 and executed by processor 201. The apparatus that is caused to perform the operation may be apparatus 200 or some other apparatus, for example but not necessarily a device comprising apparatus 200.

The apparatus obtains characteristics of radio signals, the radio signals transmitted by a positioning support device using at least one default configuration parameter value and the characteristics of radio signals measured by at least one mobile device at each of a plurality of locations. The apparatus also obtains indications of the locations of measurement. (action 211)

The apparatus furthermore assembles, based on the obtained characteristics of radio signals and the obtained indications of the locations of measurement, data which enables a determination of characteristics of radio signals transmitted by the positioning support device, wherein the characteristics of radio signals are expected to be observable at different locations. (action 212)

The apparatus furthermore determines at least one adapted configuration parameter value for the positioning support device. (action 213)

The apparatus furthermore causes the positioning support device to store the assembled data for future transmissions and to use the at least one adapted configuration parameter value for future transmissions. (action 214)

Conventional systems that enable a mobile device to determine its own position based on location dependent characteristics of radio signals of different transmitters require an Internet connection to download data on the characteristics of radio signals from the backend of a service provider. Some mobile devices may not be equipped with a cell modem or a WLAN modem that would enable them to access the Internet, though. A manual transfer of the data using a wired link instead may be troublesome and limited to few locations. Also for mobile devices that are principally able to wirelessly access the Internet, availability of the Internet may not be given whenever the data is be needed. Furthermore, some devices may have a very small memory that is unable to store a large amount of positioning assistance data, like data for an entire region or data for an entire building. Such devices may include Internet of Things (IoT) devices, like smart watches, smart bands, etc.

Certain embodiments of the first aspect of the invention therefore provide that a positioning support device is enabled to transmit information defining an association of observable characteristics of its own radio signals with different locations. Such an association may be considered a radio image. A plurality of such positioning support devices may be distributed at a certain site. Certain embodiments of the second aspect of the invention provide that information defining a radio image is assembled and that a positioning support device, which transmits the signals generating the radio image, may be caused to transmit the assembled information defining a radio image.

However, the cost and life time of a positioning support device and the performance of a supported positioning of mobile devices may depend on how such a positioning support device is configured, for instance with respect to transmission power, frequency of transmission and mode of operation. For example, an increase of the transmission power used by a positioning support device may reduce the life time of the positioning support device. For example, positioning support devices that are operated in a connectable mode may need more energy than positioning support devices that are operated in a non-connectable mode. For example, a higher frequency of transmission may need more energy than a lower frequency of transmission and thus reduce the life time of the positioning support device. Furthermore, the total number of positioning support devices may have an impact on the cost to set up a system.

Certain embodiments of the first aspect of the invention therefore provide in addition that a positioning support device uses first configuration parameter values when transmitting radio signals during a training phase and second, adapted configuration parameter values during a positioning phase once information defining a radio image has been received and is available for transmission at the positioning support device. Certain embodiments of the second aspect of the invention provide in addition that an apparatus providing the information defining the radio image also determines and provides the adapted configuration parameters.

Certain embodiments of the invention, which enable positioning support devices to transmit information on a radio image resulting from their own radio signals, may have the effect that they enable mobile devices to determine their own position based on detected radio signals and based on data which enables a determination of expected characteristics of radio signals at different locations. Certain embodiments of the invention may have the effect that they contribute to a self-contained positioning system that does not require an Internet connection or a wired connection to a server of a positioning provider to download the required data to such mobile devices. Certain embodiments of the invention may have the effect that they enable mobile devices with very small memory to determine their own position using such data, since the mobile devices will only need to store data for positioning support devices that may be observed at their current location. The number of positioning support devices for which data has to be stored at the same time at a mobile device may thus be quite small compared to the entire data for positioning support devices of a whole site, like a whole building or a whole floor of a building. Certain embodiments of the invention using an adaptive configuration with respect to one or more configuration parameters may furthermore have the effect that the performance of the positioning may be improved and that the life time of positioning support devices may be increased, in particular in case the power supply of the positioning support devices is provided by an integrated battery.

Figure 2:
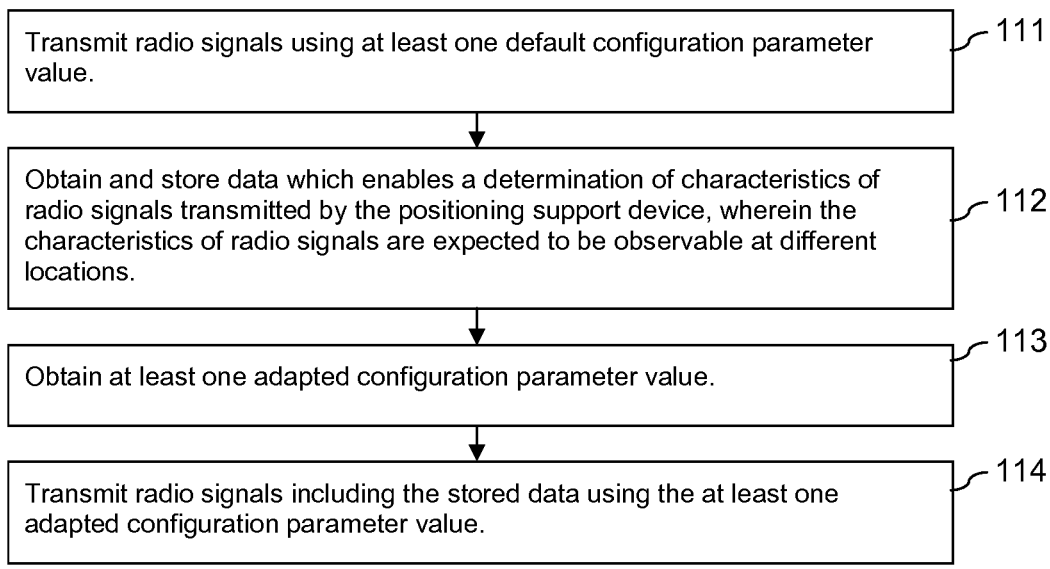
FIG. 2 is a flow chart illustrating an example embodiment of a method according to the first aspect.
Figure 4:
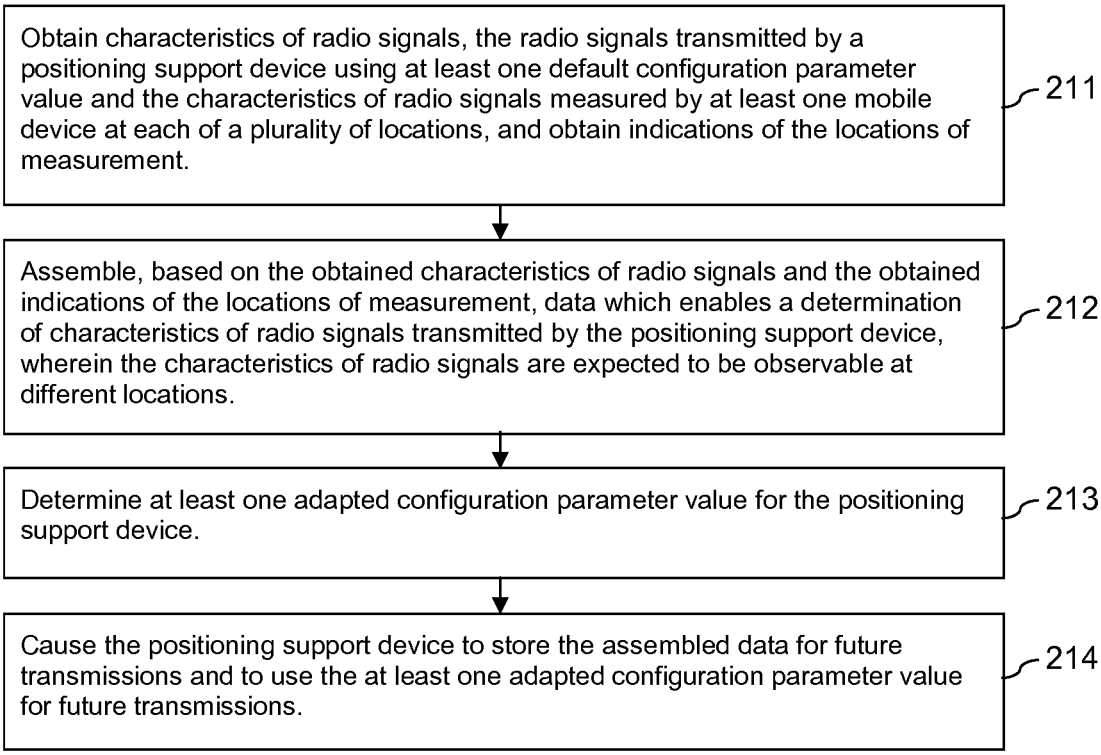
FIG. 4 is a flow chart illustrating an example embodiment of a method according to the second aspect.

Apparatus 100 illustrated in FIG. 1, apparatus 200 illustrated in FIG. 3 and the methods illustrated in FIGS. 2 and 4 may be implemented and refined in various ways.

The characteristics of radio signals that are expected to be observable at different locations may comprise for example values relating to received signal strengths of radio signals. Using received signal strength related values as characteristics of radio signals may have the effect that such values may be determined for any kind of transmitter. It may further have the effect that they may be measured at a receiving end without establishing any connection with the transmitting end. A value relating to a received signal strength of a radio signal may be for instance a received signal strength indication RSSI or a physical Rx level in dBm with a reference value of 1 mW, etc. Another kind of value relating to a received signal strength of a radio signal may be for instance an indication of a path loss of a radio signal at a particular location. Various other characteristics may be used as well, though, for instance a timing advance (TA) values or a round-trip time values. The data enabling a determination of characteristics of radio signals transmitted by a respective positioning support device may comprise for example data of a radio model for radio signals transmitted by the positioning support device. The radio model may be of any feasible kind and in any original, encoded, compressed or otherwise processed form.

In an example embodiment of the both aspects, the positioning support device furthermore obtains the at least one default configuration parameter value. To this end, the positioning support device may receive, for example, radio signals comprising the at least one default configuration parameter value. This may have the effect that also the default configuration parameter values may be set flexibly in the positioning support device regardless of an original configuration during manufacture. In an example embodiment of both aspects, the positioning support device receives radio signals comprising the data which enables a determination of characteristics of radio signals transmitted by the positioning support device. In an example embodiment of both aspects, the positioning support device receives radio signals comprising the at least one adapted configuration parameter value. Using radio signals for providing all parameter values and data that may have to be received by the positioning support device may have the effect that the positioning support device needs to support only a single data interface in the form of a radio interface that is also supported for the transmission of radio signals by the positioning support device. It may further have the effect that optionally, the parameter values and data may be provided to the positioning support device by a mobile device directly and without requiring a temporary wired connection.

In an example embodiment of both aspects, at least one of the at least one default configuration parameter value and the at least one adapted configuration parameter value comprises a transmission power value. This may have the effect that the transmission power of a positioning support device may be selected specifically for a given situation. It may be adapted for instance depending on the distance to other positioning support devices and/or depending on whether the positioning support device is placed in a corridor or in an open space, etc. Using a default configuration parameter value that is not adapted as transmission power value may have the effect that the radio image that is generated by transmissions of the positioning support device during a positioning phase is essentially the same as during a training phase.

In an example embodiment of both aspects, at least one of the at least one default configuration parameter value and the at least one adapted configuration parameter value comprises a transmission frequency value. During a training phase, the amount of data that is transmitted may be basically the same for various positioning support devices; a transmission frequency value that is used as default configuration parameter may thus be set for example to the same value for all positioning support devices. In order to efficiently and precisely reflect the actual radio image that is generated by radio signals transmitted by a positioning support device, the amount of data which enables a determination of characteristics of radio signals transmitted by a positioning support device may vary from one positioning support device to the next, though. Therefore, a transmission frequency value that is used as adapted configuration parameter value may be adapted to the respective amount of data that is to be transmitted.

In an example embodiment of both aspects, at least one of the at least one default configuration parameter value and the at least one adapted configuration parameter value comprises at least one value relating to a mode of operation. The at least one value relating to the mode of operation may indicate whether the positioning support device is to support a connection to the positioning support device. This may allow taking account of the fact that a mode supporting a connection to the positioning support device requires more energy at the positioning support device, since the positioning support device has to look out for connection requests. An example default configuration parameter value could be a value that indicates that the positioning support device is to support a connection to the positioning support device and an example adapted configuration parameter value could be a value that indicates that the positioning support device is not to support a connection to the positioning support device. However, this would mean that data and configuration of the positioning support device may not be easily updated anymore once it has been configured. In an alternative approach, the at least one default configuration parameter value therefore comprises at least one value relating to a mode of operation, which indicates that the positioning support device is to support a connection to the positioning support device in response to all transmissions of the positioning support device, and the at least one adapted configuration parameter value comprises at least one value relating to a mode of operation, which indicates that the positioning support device is to support a connection to the positioning support device in response to some transmissions of the positioning support device and that the positioning support device is not to support a connection to the positioning support device in response to other transmissions of the positioning support device. This may have the effect that some of the transmissions of a configured positioning support device still enable a connection to the positioning support device in order to update data and/or configuration, while other transmissions of a configured positioning support device do not enable a connection to the positioning support device in order to save energy. The number of transmissions, for instance in the form of transmitted packets, that do not enable a connection may be significantly higher than the number of transmissions that do enable a connection, for instance at least twice as high or at least ten times as high.

In an example embodiment of the first aspect, the positioning support device further determines and transmits, along with the stored data, some other information, like information about a state of the positioning support device. The information about a state of the positioning support device may comprise for instance information about a battery state of the positioning support device. This information—obtained at a receiving device—may form the basis for a decision whether the positioning support device or the battery of the positioning support device should be exchanged. Alternatively or in addition, the information about a state of the positioning support device may comprise for instance information about a point of time at which the positioning support device obtained the stored data. This information—obtained at a receiving device—may form the basis for a decision whether the data stored in the positioning support device and/or configuration parameter values used by the positioning support device may have to be updated. It is to be understood that various other information may be included in the transmissions as well, like an error detecting code, etc.

In an example embodiment of the second aspect, the actions are performed by an apparatus that is or belongs to a mobile device. The apparatus may then further detect radio signals transmitted by a plurality of positioning support devices in order to obtain characteristics of radio signals for the plurality of positioning support devices and identifications of the plurality of positioning support devices. The apparatus may further estimate a position of each of the plurality of positioning support devices and store an indication of the estimated positions along with the obtained identifications of the positioning support devices. The apparatus may further cause the mobile device to display a representation of the positioning support devices on a display with a spatial distribution corresponding to the estimate positions. This may have the effect that a user of the apparatus may be supported in setting up a self-contained positioning system. The user may be guided by the displayed information to the positioning support devices to which configuration values and data is to be provided by the mobile device.

Providing positioning support devices of a self-contained positioning system with the required data on their own radio images and possibly with configuration parameter values by means of a mobile device may be facilitated and accelerated significantly if visual information on the distribution of the positioning support devices is provided to a user of the mobile device. It may further reduce the likelihood that a user of the mobile device misses one of the positioning support devices in the process.

A building, for instance, may have hundreds of positioning support devices and it may be difficult for a person who is installing the system to know or remember all locations of the positioning support devices. A similar presentation may also be used for a subsequent management of the positioning support devices. It is to be understood that this approach of supporting a user in setting up a self-contained positioning system—be it in the form of a method, an apparatus, a computer program product or a computer program—may also be considered an invention of its own, that is, irrespective of whether the mobile device provides only data to the positioning support devices or whether it also determines and provides adapted configuration parameter values to the positioning support devices.

In an example embodiment of the first aspect making use of a representation of positioning support devices on a display, the representation of each positioning support device may be linked to the stored identification of the represented positioning support device. The apparatus may then furthermore detect a user selection of a displayed representation of a positioning support device. The user selection may be enabled for instance by means of a touch screen, but it may also be enabled by other means, for instance keys or buttons. The apparatus may furthermore determine the stored identification of the positioning support device that is linked to the selected representation of the positioning support device. The apparatus may furthermore establish a connection with the positioning support device using the determined identification. The apparatus may then use the established connection for causing the positioning support device to store the assembled data for future transmissions and to set the at least one adapted configuration parameter value for use for future transmissions. This embodiment may have the effect that the apparatus may scan for and respond to transmissions by a specific positioning support device that may be assumed, based on the user input, to be nearby. This may further accelerate the configuration process.

In an example embodiment of the first aspect making use of a representation of positioning support devices on a display, estimating a position of a positioning support device comprises determining a location at which a highest signal strength has been received from the positioning support device and using the location as estimated position. This may have the effect that the position may be estimated easily and such that the estimated position lies in any case within the coverage area of the positioning support device, which may be sufficient for guiding a user to a location at which a configuration of a positioning support device is possible. In a variation, estimating a position of a positioning support device may comprise determining a location at which a highest signal strength has been received from the positioning support device, and using the location as estimated position in case the highest signal strength exceeds a predetermined threshold. This may have the effect that the position may be estimated easily and rather exactly. Whether or not a position of a positioning support device may be estimated with this approach may serve at the same time as an indication whether sufficient data has been collected for the positioning support device.

An example embodiment of the first aspect making use of a representation of positioning support devices on a display further comprises determining a path between the representations of the positioning support devices on the display, and causing the mobile device to display the path on the display for guiding the user. This may have the effect that a user of the mobile device may be guided in a specified way from one positioning support device to the next. This may help the user in visiting the positioning support devices in a structured manner and in not missing any of the positioning support devices. The path may be selected for instance such that it always leads to the closest next positioning support device starting from the first positioning support device that is configured. It is to be understood that in certain embodiments, the presented order may not be binding to the user. In this case, the determined and presented path may optionally be updated each time a further positioning support device has been configured.

An example embodiment of the first aspect making use of a representation of positioning support devices on a display further comprises causing a marking of the representations of the positioning support devices on the display that have been successfully configured. The marking may be realized in any desired manner, for instance by using a different color for the representation of configured positioning support devices than for the representation of not yet configured positioning support devices.

An example embodiment of the first aspect further comprises causing the mobile device to display information relating to a state of configured positioning support devices. An example embodiment of the first aspect further comprises causing the mobile device to display information relating to a coverage achieved with configured positioning support devices. Such information may help in supplementing and/or maintaining the system.

In order to be able to transmit data, the positioning support device may comprise any kind of terrestrial transmitter, in particular, though not exclusively, any kind of non-cellular terrestrial transmitter.

In an example embodiment of either aspect, a positioning support device is or comprises at least one of a Bluetooth beacon, a Bluetooth beacon enabling Bluetooth low energy mode, and a Bluetooth low energy beacon. Bluetooth beacons are already installed in many buildings. Furthermore, Bluetooth technologies are supported by many mobile user devices by default, like by most smartphones, tablets, laptops and feature phones. Using Bluetooth beacons and/or BLE beacons as positioning support devices may thus have the effect that the supported positioning may be based in some embodiments on an existing infrastructure in buildings and/or on existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The beacons may be stand-alone devices or be integrated into or attached to some other device. The use of Bluetooth low energy may enable a positioning with limited energy consumption at all involved devices.

A Bluetooth beacon that is employed for the invention may be any kind of Bluetooth beacon complying with any present or future standard. It is to be understood, however, that other types of positioning support devices than variations of Bluetooth beacons may be used as well, for instance tags or other devices that are configured to transmit ultra-wideband (UWB) signals or ultra-sound signals or any wireless signals that might emerge in the future.

In an example embodiment of both aspects, the radio signals transmitted by each of the plurality of positioning support devices are transmitted in a broadcast and/or as advertising data, for instance as advertising data in at least one air interface packet, and/or using at least one advertising channel, for instance at least one advertising channel that is provided for broadcasts. Each of these embodiments may have the effect that a mobile device that is to be positioned does not have to be enabled to open a communication channel and that the positioning may thus be accelerated. This may further have the effect that the data that is transmitted in a single broadcast may be used by many mobile devices. This may save bandwidth as well as energy at the positioning support device. Advertising data is furthermore widely used for discovery of radio transmitters, which may enable a convenient adaptation of existing approaches for transmitting conventional advertising data for transmitting the data stored in a positioning support device according to the invention.

Figure 5:
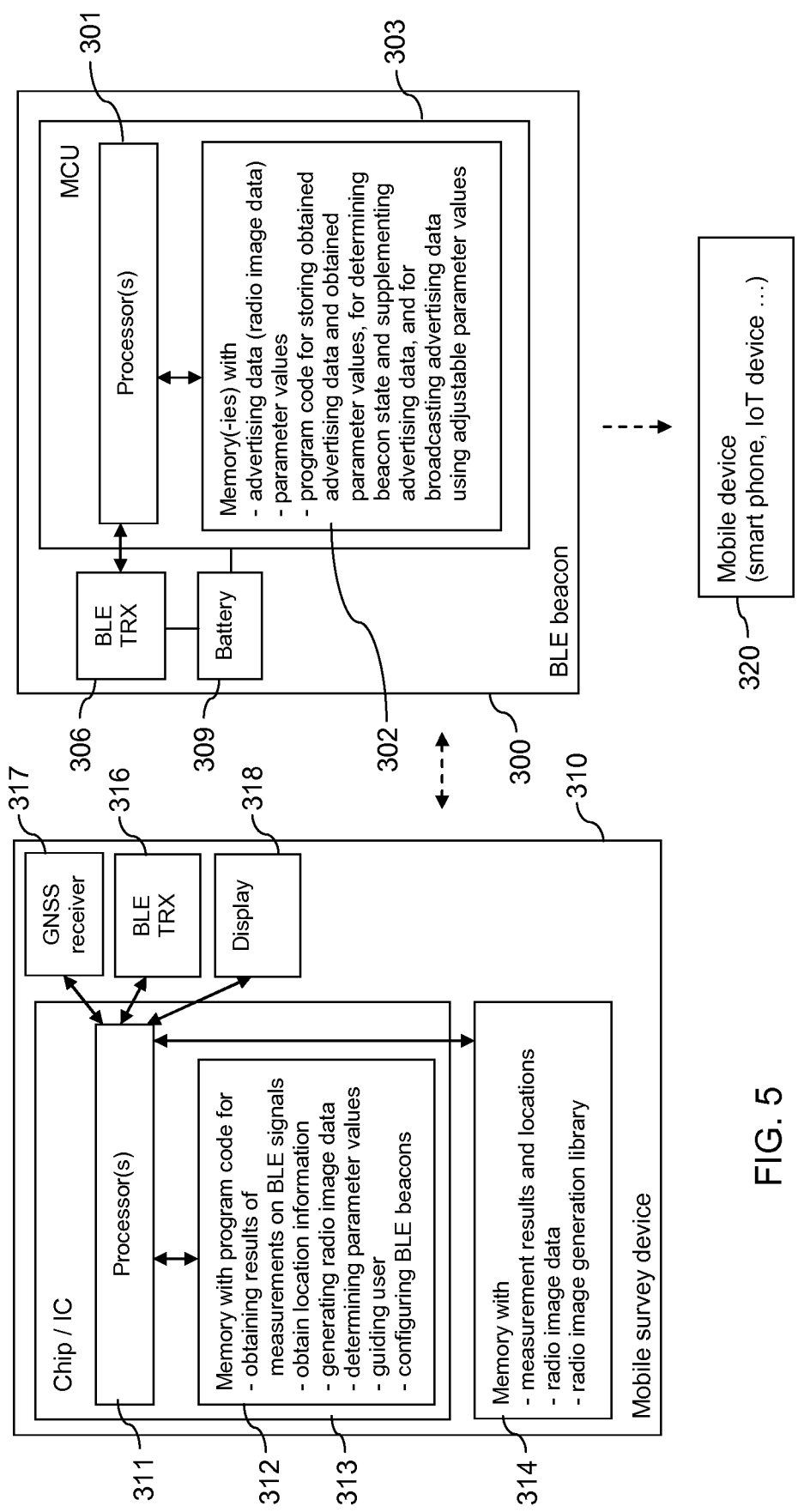
FIG. 5 is a schematic block diagram of an example embodiment of a system comprising an example embodiment of an apparatus according to the first aspect and an example embodiment of an apparatus according to the second aspect.

FIG. 5 is a schematic block diagram of an example embodiment of a system supporting a configuration of positioning support devices, the system making use of example embodiments of both aspects of the invention.

The system comprises a plurality of BLE beacons, of which only a single BLE beacon 300 is depicted, at least one mobile survey device 310 and mobile devices, of which only a single mobile device 320 is depicted, which may desire to determine their own position.

BLE beacon 300 is an example positioning support device. It comprises at least one processor 301 that is linked to at least one memory 302 and to a BLE transceiver (TRX) 306. BLE beacon 300 further comprises a battery 309.

Processor 301 is configured to execute computer program code, including computer program code stored in memory 302, in order to cause BLE beacon 300 to perform desired actions.

Memory 302 may be a main memory of BLE beacon 300. Memory 302 is configured to store advertising data, parameter values and computer program code. Memory 302 stores computer program code for broadcasting advertising data using adjustable configuration parameter values and computer program code for storing and updating advertising data in memory 302. Some of the program code in memory 302 may be similar to program code in memory 102. In addition, memory 302 may store computer program code configured to realize other functions. In addition, memory 302 may also store other kind of data.

Processor 301 and memory 302 may optionally belong to a microcontroller unit (MCU) 303 of an integrated circuit on a single chip. The integrated circuit or the chip may comprise in addition various other components, for instance a further processor or memory.

It is to be understood that the content of memory 302 may also be distributed to several memories. For example, a first memory may be provided for storing the computer program code and parameter values and a second memory may be provided for storing data.

BLE transceiver 306 is a component which enables beacon 300 to transmit and receive signals in line with any current or future version of the Bluetooth standard supporting a low energy mode.

Battery 309 is connected to any component of BLE beacon 300 that requires power supply, for instance to BLE transceiver 306 and to processor 301 of MCE 302. Battery 309 or a circuitry comprising battery 309 may furthermore be configured to provide an indication of the current battery state to processor 301. Battery 309 may or may not be exchangeable.

It is to be understood that beacon 300 may comprise various other components.

Component 303 or beacon 300 may be an example embodiment of an apparatus according to the first aspect of the invention.

While only a single BLE beacon 300 is depicted in FIG. 6, it is to be understood that other beacons of the plurality of BLE beacons may have the same or similar structure as beacon 300.

Mobile survey device 310 may be for instance a regular mobile terminal, like a smartphone or general purpose tablet PC, or a dedicated survey device. Mobile survey device 310 comprises a processor 311 that is linked to a first memory 312, to a second memory 314, to a BLE component 316, optionally to at least one GNSS receiver 317 and to a display 318.

Processor 311 is configured to execute computer program code, including computer program code stored in memory 312, in order to cause mobile survey device 310 to perform desired actions.

Memory 312 stores computer program code for obtaining results of measurements on BLE signals, computer program code for obtaining location information, computer program code for generating radio image data, computer program code for determining suitable configuration parameter values, computer program code for guiding a user of mobile survey device 310 and computer program code for configuring BLE beacons. All of this computer program code may belong for instance to a survey application. Some of the program code in memory 312 may be similar to program code in memory 202. In addition, memory 312 may store computer program code configured to realize other functions, for instance computer program code for providing feedback to a user of mobile survey device 310 on the achieved quality of a survey, etc. In addition, memory 312 may also store any kind of data.

Processor 311 and memory 312 may optionally belong to a chip or an integrated circuit 313, which may comprise in addition various other components, for instance a further processor or memory.

Memory 314 is configured to store data, including for example results of measurements on BLE signals, locations of measurement and generated radio image data. It may be configured to store any other desired data as well. It may store for instance a radio image generation library, which may comprise any basic information that is required for generating radio image data.

BLE component 316 includes at least a BLE transceiver (TRX). BLE component 316 is configured to scan for radio signals that are broadcast by BLE beacons 300 and to perform radio measurements on such radio signals. In addition, BLE component 316 is configured to enable mobile survey device 310 to establish a BLE connection with BLE beacons 300. It is to be understood that any computer program code required for receiving, evaluating and transmitting BLE signals may be stored in an own memory of BLE component 316 and executed by an own processor of BLE component 316, or it may be stored for example in memory 312 and executed for example by processor 311.

The at least one GNSS receiver 317 may comprise any kind of global navigation satellite signal receiver, for example a GPS receiver and/or a GLONASS receiver and/or a GALILEO receiver. It may be configured to receive corresponding satellite signals and to determine the current position of mobile survey device 310 based on the signals, possibly using provided assistance data. It is to be understood that any computer program code required to this end may be stored in an own memory of GNSS receiver 317 and executed by an own processor of GNSS receiver 317, or it may be stored for example in memory 312 and executed for example by processor 311.

Display 318 may be for instance a touch sensitive display.

It is to be understood that mobile survey device 310 may comprise various other components, like further user input and output means, a cellular communication component enabling a communication via cellular communication networks and/or a WLAN component enabling a communication via WLANs.

Component 313 or mobile survey device 310 may be an example embodiment of an apparatus according to the second aspect of the invention.

It is to be understood that several mobile survey devices 310 could be provided for use in the system of FIG. 5.

Mobile device 320 may be for instance a regular mobile terminal, like a smartphone or general purpose tablet PC, or it may be for instance an IoT device, like a smart watch or a smart band, etc. Mobile device 320 is configured to determine its own position based on measurements on BLE signals and based on radio image data extracted from BLE signals. Furthermore, while the invention enables a positioning of mobile devices that have neither a cellular communication component enabling a communication via cellular communication networks nor a WLAN component enabling a communication via WLANs, it is to be understood that certain embodiments of mobile device 320 may comprise such components as well.

The operations in the system of FIG. 5 belong partly to a training phase, in which BLE beacons are configured and provided with positioning support data, and partly to a positioning phase, in which BLE beacons broadcast positioning support data to enable mobile devices to determine their own position. It is to be understood that some operations of the training phase may be performed while the positioning phase has already started. The operations of the training phase may be performed only once. Alternatively, it may be repeated at fairly long intervals in order to enable updates in the case of changes in the arrangement of BLE beacons or changes in the radio environment due to construction measures, like relocation of internal walls, etc. Further alternatively, it may be repeated partially for supplementing the system and/or for enabling a replacement of individual BLE beacons.

BLE supports a transmission of data channel packets and of advertising channel packets. The following example details are based on the Specification of the Bluetooth® System Version 4.2 of Dec. 2, 2014 by the Bluetooth SIG. For further details, reference is made to this specification.

An LE advertising broadcast channel is provided to set up connections between two devices or to communicate broadcast information between unconnected devices. The LE advertising broadcast channel is a set of three fixed physical channels.

Each BLE packet that is transmitted over the air interface has a defined packet format that is used on a link layer for both advertising channel packets and data channel packets. The packet comprises a preamble of 1 octet, an access address of 4 octets, a packet data unit (PDU) of 2 to 257 octets, and a cyclic redundancy check value (CRC) of 3 octets. Advertising channel packets use a fixed value for the preamble and for the access address of the BLE packet. When a BLE packet is transmitted in an advertising physical channel, the PDU is a specifically defined advertising channel PDU. The CRC is calculated over the PDU.

The specifically defined advertising channel PDU comprises a header of 16 bits and a payload.

The header comprises, among other fields, a field for indicating a PDU type, a TxAdd field and a length field for indicating the payload length in octets. The possible range of the payload length is 6 to 37 octets.

The PDU type field comprises four bits. The advertising channel PDU types indicated by these bits comprise a type ADV_IND for a connectable undirected advertising event, a type ADV_DIRECT_IND for a connectable directed advertising event, a type ADV_NONCONN_IND for a non-connectable undirected advertising event and a type ADV_SCAN_IND for a scannable undirected advertising event.

The payload comprises an AdvA field of 6 octets for indicating a beacon's public or random device address, as indicated by the one bit TxAdd field in the header. The payload further comprises an AdvData field of 0 to 31 octets. The AdvData field may receive advertising data of any type that is stored in the advertising data section of main memory 302 of BLE beacon 300.

It is to be understood that any other packet format could be used just the same, for example though not exclusively a packet structure providing for an advertising data field of up to 255 octets in line with future Bluetooth specifications, etc.

Example operations in the system of FIG. 5 will now be described with reference to a flow chart presented in FIGS. 6a and 6b. Example operations at mobile survey device 310 are presented on the left hand side. Processor 311 and some of the program code stored in memory 312 may cause mobile survey device 310 to perform the presented actions when the program code is retrieved from memory 312 and executed by processor 311. This may be the case, when a survey agent using mobile survey device 310 activates a survey application. Example operations at BLE beacon 300 are presented on the right hand side. Processor 301 and some of the program code stored in memory 302 may cause BLE beacon 300 to perform the presented actions when the program code is retrieved from memory 302 and executed by processor 301.

A survey agent using mobile survey device 310 is requested to distribute a plurality of BLE beacons at a localization site, by way of example in a large building like a shopping mall. The BLE beacons may be placed for example in the form of a grid with a specified distance, approximately, between the BLE beacons, such that the location of each BLE beacon may be considered a grid point of the grid. In an example embodiment, the specified distance may be set to 8 meters. The survey agent may be guides by a floor plan displayed on display 318. The BLE beacons 300 may or may not be physically fixed to their location, but in any case, it is assumed that all or most of them will remain at their location for a longer time.

When the survey agent has placed a BLE beacon 300 at a desired location, the survey agent activates BLE beacon 300. During manufacture, BLE beacon 300 may have been configured to enter a standby state when activated. In the standby state, only a scanning may be performed. The survey agent uses mobile survey device 310 for establishing a connection to BLE beacon 300 and for providing default configuration parameter values to BLE beacon 300. (action 401)

The default configuration parameter values comprise a default transmission power. The default transmission power may be selected for instance under consideration of the specified distance between the BLE beacons. The transmission power and thus the coverage range of the BLE beacons may be selected such that with the specified distance between BLE beacons, at least a predetermined number of BLE beacons may be expected to be observed at each location of the localization site at which a positioning of mobile devices is to be supported. With a specified distance of 8 meters, the default transmission power may be set for instance to 0 dB. It is to be understood that the same default transmission power may or may not be used for all beacons. For instance, the beacons may be classified into different classes and a different default transmission power value may be defined for each class. In an example embodiment, the two classes may be beacons placed in corridors and beacons placed in open spaces. The default transmission power of beacons placed in corridors may be set to 0 dB and the default transmission power of beacons placed in open space may be set to −5 dB. Other differentiations may be used as well. For instance, if it is not possible to use approximately the specified distance in certain areas, a higher default transmission power value may be selected. If a single default transmission power value is used for all beacons, the value may be selected automatically by mobile survey device 310 or be based on a single user input to mobile survey device 310. If different default transmission power values are used, the appropriate value may be selected for instance based on an individual user input for each BLE beacon.

Enabling a setting of the transmission power may allow using the most cost efficient compromise between the number of required BLE beacons and a long life time of the BLE beacons, while ensuring at the same time a good coverage throughout the building.

The default configuration parameter values furthermore comprise a default frequency for transmitting advertising packets during the training phase. The default frequency may be set for instance to 2 Hz. It is to be understood that any other value may be used as well.

The default configuration parameter values furthermore comprise a default mode. The default mode may be an advertising mode, in which the beacon transmits advertising packets indicating that the beacon is connectable. This mode is required for the training phase in order to enable mobile survey device 310 to cause BLE beacon 300 to store radio image data and to set adapted configuration parameter values.

The default configuration parameter values furthermore comprise a default address type value indicating that the address used in the advertising packets is to be the public address of the beacon rather than a random address.

BLE beacon 300 receives the default configuration parameter values and sets internal parameter values accordingly. (action 501)

The set mode of operation causes BLE beacon 300 to broadcast advertising packets. (action 502)

BLE beacon 300 broadcasts advertising packets on the LE advertising channel using the previously received default configuration parameter values. That is, BLE beacon 300 uses the indicated transmission power and the indicated transmission frequency. The transmission interval may also comprise a random component in order to enable mobile devices to detect signals from all BLE beacons in the neighborhood. Moreover, within the packets, the PDU type field of the header section of the advertising PDU may include the four bits defining the PDU type ADV_IND to indicate that the packets belong to a connectable undirected advertising event. Moreover, the TxAdd field of the header section of the advertising PDU may be set to "0" to indicate that the included address is a public address. The AdvA field of the payload section of the advertising PDU may include the beacon's 6 octet MAC address as a public address.

In action 502, no data may be entered into the AdvData field of the payload section of the advertising PDU when assembling and broadcasting advertising packets, and thus the field may have a length of zero octets. Such advertising packets may be considered "empty" advertising packets. It is to be understood, however, that if the advertising data section of main memory 302 of BLE beacon 300 already contains some data, this data may be contained in or distributed to AdvData fields of the broadcast advertising packets.

Once all BLE beacons for the building have been distributed and configured with default configuration parameter values, the survey agent is requested to visit all areas of interest at which a positioning is to be supported so that mobile survey device 310 may survey the radio environment of the building. (action 402) The completion of the configuration task may be detected at mobile survey device 310 for instance based on an input of the survey agent to mobile survey device 310.

For the survey, mobile survey device 310 may set BLE component 316 to a scanning mode. BLE component 316 scans for radio signals from BLE beacons in the environment at regular intervals while the survey agent is slowly moving through the building. The survey agent may be guided again, for instance, by a floor plan displayed on display 318 of mobile survey device 310. Whenever BLE component 316 detects at least one BLE radio signal during a scan, BLE component 316 measures the received signal strength (RSS) of each radio signal and extracts a medium access control (MAC) address of the transmitting BLE beacon 300 from the radio signal. The measured radio signal strength values may then be considered to be characteristics of the observed radio signals and the MAC addresses may be considered identifiers (ID) of the BLE beacons transmitting the radio signals.

In addition, an indication of the current position of mobile survey device 310 is obtained for each location at which measurements are performed during a scan. The survey agent may be required for example to enter information on a respective measurement location manually, for instance based on a grid covering the floor plan presented on display 318. The survey agent may be enabled to enter such information in various ways via any kind of user interface. The input as such may be enabled for instance by means of a touch sensitive screen of display 318 or by means of keys and/or buttons of mobile survey device 310 in combination with a display of mobile survey device 310 that is not touch sensitive. Alternatively, GNSS receiver 317 may be activated automatically as well by mobile survey device 310 when BLE component 316 is activated. GNSS receiver 317 may capture satellite signals and estimate the position of mobile survey device 310 at the same regular intervals in which scans for BLE radio signals are performed, for example once per second. Since the satellite signals may be difficult to receive within buildings, such a positioning may be an assisted GNSS (AGNSS) based positioning using available assistance data. The assistance data may be provided for example by some GNSS assistance server via a cellular communication network. The indicated position may have a horizontal component, for instance a longitude value and a latitude value, or easting and northing values. In addition, it may have an indication of the floor on which the survey agent is located. The indication of the floor may be obtained for instance in either case from a general input by the survey agent when reaching a new floor. Alternatively, the position estimated by GNSS receiver 317 may include an altitude component, and the altitude may be mapped to a respective floor based on a reference altitude of the ground floor and some general or building specific information on the height of floors.

In the case of a GNSS based positioning, an indication of the respective position of the survey agent may be indicated on the floor plan as well as a further guidance. Alternatively, the survey agent may try to uniformly pass through all parts of the building on his own. Some feedback may equally be given to the survey agent on display 318 to indicate which areas have already been covered.

It is to be understood that alternatively or in addition, other means may be used for determining the locations of measurements. For example, at least one motion sensor, like an accelerometer and/or a gyroscope, and/or a magnetometer may also be used in combination with manual input or GNSS estimated positions to collect information on the locations of measurements.

The RSS values and the associated BLE beacon IDs obtained during a scan as well as the obtained indication of the location of measurement are stored in memory 314.

Once the survey of the building has been completed, mobile survey device 310 assembles radio image data separately for each BLE beacon 300 based on the stored data. (action 403)

To this end, mobile survey device 310 defines for each BLE beacon 300 for which data is stored a grid, with grid points corresponding to geographical locations in the building, such that the grid covers at least the coverage area of the particular BLE beacon 300. The grid may be of predetermined size; or the size may be adjusted based on the locations of measurements at which signals of the particular BLE beacon 300 have been detected. The grid may be a three-dimensional grid having for instance the form of a cuboid, in order to cover different floors of the building. Alternatively, a separate rectangular two-dimensional grid may be defined for each floor of the building on which radio signals of the particular BLE beacon 300 have been detected. Mobile survey device 310 then maps each stored RSS value that is associated in memory 314 with the BLE beacon identifier of the particular BLE beacon 300 to a grid point of the grid defined for this BLE beacon 300. The grid point to which the RSS value is mapped corresponds to a geographical location that is closest to the location of measurement associated in memory 314 with the RSS value. If several RSS values for the same BLE beacon 300 would have to be mapped to the same grid point, these RSS values may be averaged and the average value may be mapped to the grid point of the grid that is defined for the particular BLE beacon 300.

There may be some grid points of the grids to which no RSS values have been mapped. In case the further processing requires grids with an RSS value mapped to each grid point, these grid points without RSS values may be provided with RSS values by interpolating surrounding RSS values if possible, and by extrapolating neighboring RSS values otherwise.

The assembly of radio image data for a particular BLE beacon 300 may include various additional processing operations.

For example, mobile survey device 310 may compress the radio image data of each BLE beacon 300. There are several options to realize such a compression of radio image data.

The radio image may be compressed for instance by applying a discrete cosine transform (DCT) to the radio image data. If the RSS values mapped to the grid points of a K-dimensional grid are represented as elements of a K-dimensional matrix, applying a DCT to this matrix will result a matrix of the same dimension and size. The DC component, which indicates the mean of the RSS values in the radio image, may optionally be processed separately. In this case, the DC component may be subtracted from the RSS values in the radio image and the DCT may be applied to this zero mean radio image. Each matrix element of the resulting matrix may be considered a DCT component that is composed of a DCT index defining the position in the matrix and a DCT value. A compression may now be achieved by selecting and keeping only the DCT components with the highest DCT values. The DCT indices of the selected DCT components and/or the DCT values of the selected DCT components may be compressed further using any desired lossless compression technique. A DCT compression of the radio image of a BLE beacon 300 may be suited to reduce the size of the image to few tens of bytes. It is to be understood that other frequency transforms than DCT may be used as well, which may be more complex but not require a grid with RSS values mapped to each grid point.

Alternatively, the radio image may be compressed for instance by computing parameters of a parametric radio model of the radio environment of each BLE beacon 300, like a path loss model, based on the radio image data. This would allow representing the radio image of each BLE beacon 300 by a limited set of parameter values, like the location of the BLE beacon 300, a transmission power or apparent transmission power of the BLE beacon 300, and a path loss exponent. The apparent transmission power may be a transmission power that is observed or estimated to be observable at a reference distance from an estimated location of the BLE beacon 300, for instance at a distance of 1 meter. Such parameter values may be computed for instance using a Gauss-Newton method. While a compression by means of a frequency transform may enable a more accurate reconstruction of the original radio image, the use of a parametric radio model may enable a particularly high compression of data. The latter approach would equally not require a filling up missing RSS values of the grid.

Any basic data that may be required for actions 401 to 403, like coordinates of an origin, floor plans, grid sizes and grid steps, default values, coding tables, etc., may be comprised in the radio image generation library that is stored in memory 314.

Various further processing operations, including for instance encryption operations, may be applied to the radio image data, as long as the original radio image data may be reconstructed with satisfactory quality.

Mobile survey device 310 now determines adapted configuration parameter values for each BLE beacon 300 for which radio image data has been assembled. (action 404) The transmission power value and the address type value should remain the same as before, since they form the basis of the assembled radio image data. However the values of other parameters, like the transmission frequency and the mode of operation, may be adapted.

The transmission frequency may be determined individually for each BLE beacon 300. A respective transmission frequency value may be selected such that the assembled radio image data may be transmitted within a specified period of time by each BLE beacon 300, for example within one second. It is to be understood that any other period of time may be selected just the same. The frequency may thus depend on the size of the radio image data that has been assembled for a respective BLE beacon 300. With efficiently compressed radio image data and a payload enabling advertising data of up to 31 octets, a transmission frequency between 2 Hz and 5 Hz may generally be sufficient.

Furthermore, configuration parameter values may be determined that relate to the mode of operation of the BLE beacons. Broadcasting non-connectable advertising packets requires less energy than broadcasting connectable advertising packets. Using a non-connectable mode may thus result in a longer life time of the BLE beacons. However, in order to enable a later update of the BLE beacons, the BLE beacons may be desired still to broadcast connectable advertising packets occasionally. The configuration parameter values may thus be selected such that they define an interleaving of a connectable mode and a non-connectable mode. The interleaving may be selected such, for instance, that packets representing a non-connectable event are transmitted more often than packets representing a connectable event. For example, a respective packet representing a connectable event may be broadcast after respective ten packets representing a non-connectable event. The required configuration parameter values—that is an identification of the PDU types and the number of packets to be used with each PDU type—may be the same for all beacons and be predefined in mobile survey device 310, e.g. as a part of the survey application. Alternatively, the beacons could store for instance several definitions for the use of operation modes, so that mobile survey device 310 only has to select a respective identifier for a suitable definition.

The survey agent is now required to revisit the coverage area of all BLE beacons so that mobile survey device 310 may provide the assembled radio image data and the determined configuration parameter values to the BLE beacons. The survey agent may be guided to the BLE beacons by mobile survey device 310.

To this end, mobile survey device 310 estimates the location of all BLE beacons for which radio image data has been assembled in action 403. (action 405)

The estimated location of a BLE beacon 300 may correspond to the location at which the highest received signal strength of signals transmitted by BLE beacon 300 was measured in action 402. Optionally, the location of measurement of the highest received signal strength value may only be used as estimated location, in case this highest received signal strength value exceeds a predetermined threshold value, for example −80 dB. It is to be understood that any other threshold value may be used as well. If such a received signal strength value is not available, measurement data for BLE beacon 300 may be considered not sufficient as a basis for reliable radio image data. The beacon IDs of such beacons may be stored separately for further consideration, e.g. in the scope of a later, supplementary data collection.

It is to be understood that the locations may also be estimated in the scope of action 403, in particular though not exclusively in case the assembled radio image data includes the estimated location of a BLE beacon 300 as a parameter value of a parametric radio model.

Based on the estimated beacon locations, mobile survey device 310 generates and displays an interactive image. (action 406) The image is displayed on display 318 of mobile survey device 310. The image may include the floor plan and a representation of the estimated location of each BLE beacon 300 in the floor plan. The representation may be colored. Optionally, the representation of each BLE beacon 300 may include an indication of the MAC address of the BLE beacon 300. The display area of the representation of each BLE beacon 300 is linked to a MAC address of the respective BLE beacon 300 stored in memory 314. Data on the links may be stored as well in memory 314.

Figure 7:
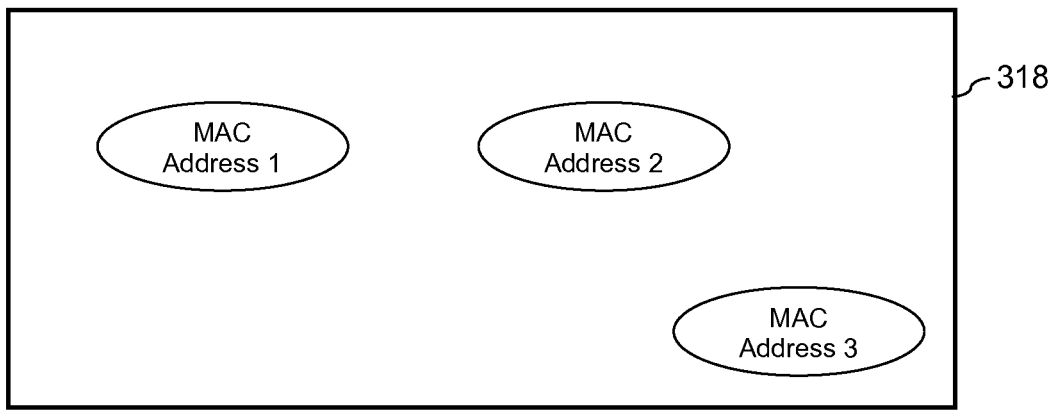
FIG. 7 is a diagram illustrating a first example presentation on a display during the operations of FIG. 6*a/b;*

An example of a displayed image (without floor plan) is schematically illustrated in FIG. 7. FIG. 7 presents display 318, on which three BLE beacons are illustrated by a respective ellipse indicating the MAC address of the respective beacon, here indicated for reasons of simplicity as MAC Address 1, 2 and 3. The distribution of the representation on display 318 corresponds to the distribution of the BLE beacons on a particular floor of the building. The ellipses are colored white, but when using a color display, they could be colored red, for instance. The color may indicate that none of the BLE beacons has been provided with assembled radio image data and adapted configuration parameter values so far.

Mobile survey agent may now approach the closest BLE beacon taking account of the representations on display 318. When mobile survey agent assumes that he is fairly close to one of the represented beacons, he may touch the corresponding representation of the BLE beacon on display 318.

Referring to the example of FIG. 7, for instance, the survey agent may assume that the BLE beacon with MAC Address 1 is closest to his current position, move to the estimated and displayed location of this BLE beacon and touch the representation of this BLE beacon on display 318.

Mobile survey device 310 detects the user selection. (action 407)

Mobile survey device 310 looks up the associated stored MAC address of the selected BLE beacon 300. (action 408)

Then, mobile survey device 310 listens to the LE advertising channel to detect advertising packets with the determined MAC address in the PDU of the packets. Due to the default configuration used for the broadcasts of action 502, BLE beacon 300 is in a connectable mode. Once mobile survey device 310 detects the appropriate MAC address in an advertising packet, it may therefore request BLE beacon 300 to establish a BLE connection. (action 409)

Since BLE beacon 300 is operating in the connectable mode, it scans for and receives the connection request and establishes the connection to requesting mobile survey device 310. (action 503)

Once a connection with a particular BLE beacon 300 has been established, mobile survey device 310 causes BLE beacon 300 to store the radio image data that has been assembled specifically for this BLE beacon 300 and to set the configuration parameter values that have been determined (in part) specifically for this BLE beacon 300. (action 410)

BLE beacon 300 receives the radio image data and the adapted configuration parameter values via the established connection, stores the radio image data in the advertising data section of memory 302 and sets internal configuration parameters to the received adapted configuration parameter values in a corresponding section of memory 302. The received and stored radio image data contains exclusively radio image data for the BLE beacon 300 receiving the data. (action 504) In addition, BLE beacon 300 may add an indication of time to the advertising data section. This time may be provided by mobile survey device 310 as the time at which the radio image data has been assembled, or it may be the current time of an internal clock of BLE beacon 300.

BLE beacon 300 furthermore determines the state of its battery 309 and adds an indication of the battery state to the advertising data section. (action 505)

It is to be understood that mobile survey device 310 may have knowledge of the amount of data that is added by BLE beacon 300 to the advertising data section and take account of this additional data when determining the transmission frequency in action 404.

Thereafter, BLE beacon 300 broadcasts advertising packets using the default transmission power, the adapted transmission frequency and the adapted, alternating modes of operation, and including a respective indication of the used mode of operation and the MAC address of BLE beacon 300 in the packets. The used modes of operation may be indicated for example by the four bits of the PDU type field defined for ADV_IND when BLE beacon 300 is in connectable mode and for ADV_NONCONN_IND when BLE beacon 300 is in non-connectable mode, respectively. The content of the data stored in the advertising data section of main memory 302, including with the radio image data of BLE beacon 300, is distributed to the AdvData fields of the payload of the advertising PDUs of the required number of subsequent advertising packets. (action 506) The battery state in the advertising data section of memory 302 may be updated in action 505 for example every second or at other regular intervals.

In the meantime, mobile survey device 310 continues with configuring further BLE beacons.

When mobile survey device 310 has successfully configured a BLE beacon 300 with action 410, mobile survey device 310 updates the image that is displayed on display 318. (action 411) Optionally, mobile survey device 310 may obtain a confirmation whether the configuration has indeed been successful by checking whether the configured BLE beacon 300 is now advertising its radio image data in line with action 506. The update of the displayed image may comprise a change of color of the representation of the BLE beacon 300 that has been (presumably) successfully configured. Mobile survey device 310 may further determine and present a path to the respective next BLE beacon for all remaining BLE beacons that still have to be configured.

Figure 8:
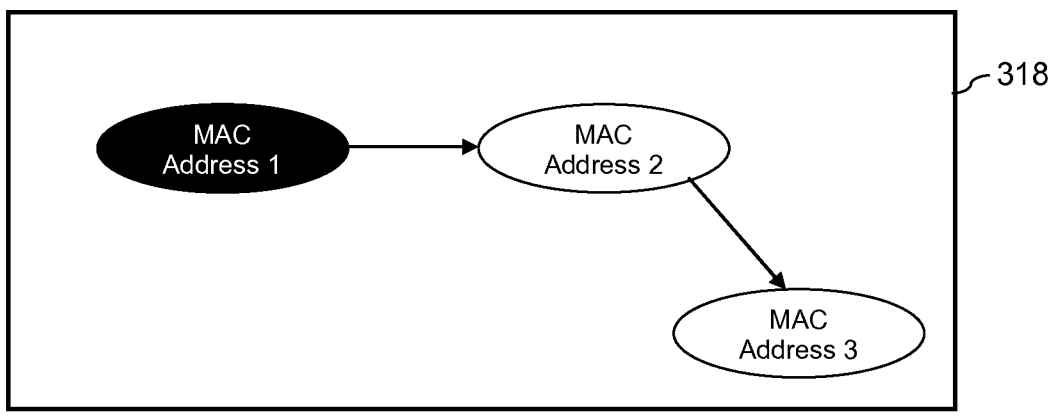
FIG. 8 is a diagram illustrating a second example presentation on a display during the operations of FIG. 6*a/b;*

An example of an updated displayed image is schematically illustrated in FIG. 8. The image corresponds to the image in FIG. 7, except that the representation of the BLE beacon with MAC Address 1 is now colored black instead of white and that arrows are indicated between the representations of the BLE beacons. The changed color may indicate that the beacon with MAC Address 1 has already been provided with assembled radio image data and adapted configuration parameter values. When using a color display, the color may be changed for instance from red to green. The arrows indicate the respective closest BLE beacon starting from the BLE beacon that has just been configured and at which the survey agent can be expected to be located. In the presented example, the arrows point from the BLE beacon with MAC Address 1 to the BLE beacon with MAC Address 2 and further from the BLE beacon with MAC Address 2 to the BLE beacon with MAC Address 3.

Based on the updated display, the survey agent may now move to the indicated location of the next BLE beacon with MAC Address 2 and upon arrival select this BLE beacon by touching the representation of the BLE beacon on display 318. Mobile survey device 310 may then continue with actions 407 to 411.

Figure 9:
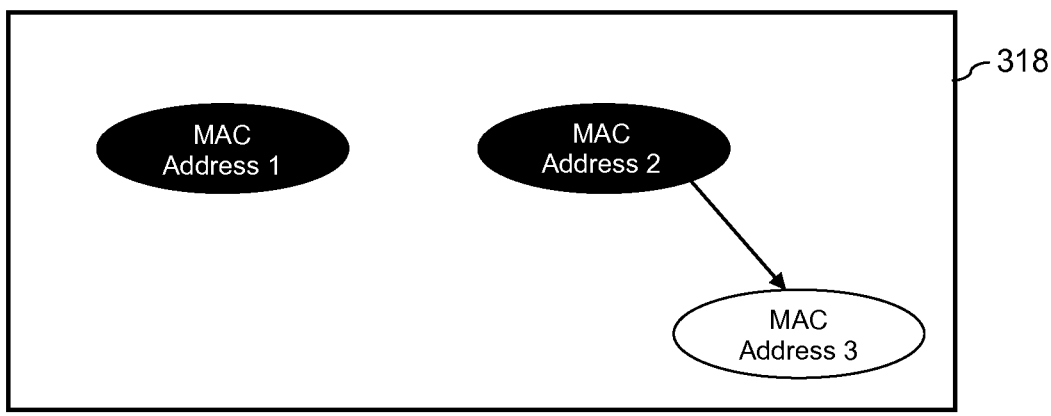
FIG. 9 is a diagram illustrating a third example presentation on a display during the operations of FIG. 6*a/b;*

An example of a displayed image further updated after such an iteration is schematically illustrated in FIG. 9. The image corresponds to the image in FIG. 8, except that also the representation of further successfully configured BLE beacon with MAC Address 2 is now colored black instead of white and that the arrow pointing from BLE beacon with MAC Address 1 to BLE beacon with MAC Address 2 has been removed again.

It is to be understood that the survey agent does note have to be obliged to follow the indicated order. Rather he may be enabled to select any BLE beacon for configuration according to his convenience. In case the survey agent deviates from the indicated path, the path to the remaining BLE beacons can be updated from the location of the last configured BLE beacon.

Figure 10:
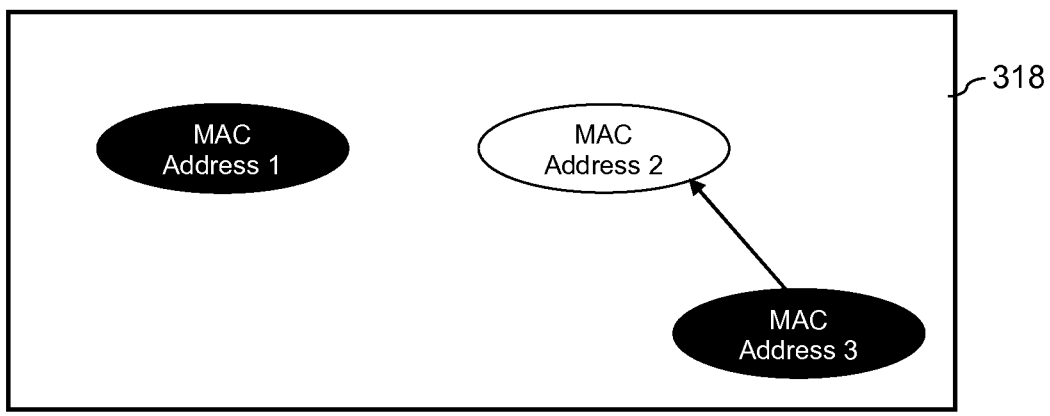
FIG. 10 is a diagram illustrating a fourth example presentation on a display during the operations of FIG. 6*a/b;*

An example of an alternative to the further updated image schematically illustrated in FIG. 9 is schematically illustrated in FIG. 10. In this case, the survey agent decided to first configure the BLE beacon with MAC Address 3 instead of the BLE beacon with MAC Address 2 after having configured BLE beacon with MAC Address 1. The image thus corresponds to the image in FIG. 8, except that also the representation of the further successfully configured the BLE beacon with MAC Address 3 is now colored black instead of white. Moreover, the arrow pointing from the BLE beacon with MAC Address 1 to the BLE beacon with MAC Address 2 has been removed, and the orientation of the arrow pointing from the BLE beacon with MAC Address 2 to the BLE beacon with MAC Address 3 has been reversed.

Actions 407 to 411 are repeated until all BLE beacons have been configured. Thereafter, survey agent may be provided by mobile survey device 310 with a message on display 318 indicating completion of the configuration process. (action 412)

Figure 11:
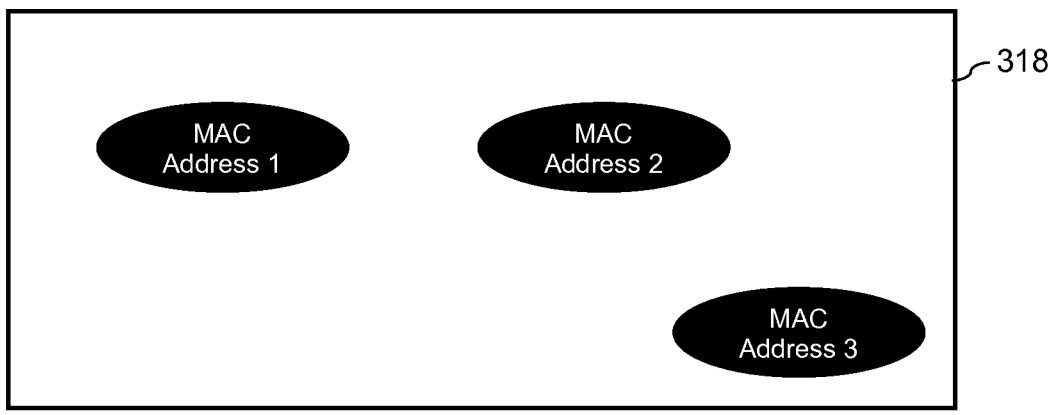
FIG. 11 is a diagram illustrating a fifth example presentation on a display during the operations of FIG. 6*a/b;*

Such a message may be conveyed for example by means of a final updated displayed image, as schematically illustrated in FIG. 11. The image corresponds to the image in FIG. 7, except that the representations of all BLE beacons are now colored black instead of white, indicating that all BLE beacons have been successfully configured.

This image or some additional message may trigger the survey agent to perform additional steps, like testing the performance of the system.

The survey agent may cause mobile survey device 310 to test the system in various ways, and either right after the configuration has been completed or at some later point of time. (action 413) The testing may equally be supported by information that is presented on display 318 or via some other user interface.

Some testing may make use of a presentation that is based on an image as schematically presented in action 11. For instance, after a while the survey agent may revisit the building and move through the coverage area of all represented BLE beacons. When the survey agent may assume to be close to a particular BLE beacon based on the indicated representations of BLE beacons, he may tap onto the representation of the particular BLE beacon to cause information on the remaining battery charge of the BLE beacon and the time when the BLE beacon was configured to be displayed on display 318. The information may be obtained by mobile survey device 310 by listening to the advertising packets broadcast by the BLE beacons and by extracting corresponding information. BLE beacons with low battery state may be replaced or their batteries may be replaced, if possible. BLE beacons with old data may be updated, for instance to take account of reconstructions within the building that may have an effect on the current radio image generated by transmissions of the BLE beacon.

Display 318 or any other user interface may also present to a survey agent information on the health of the self-contained positioning system as a whole. After setting up the system, a survey agent may visit the site and collect data on the site. Mobile survey device 312 may determine and plot information about the number of BLE beacons observed per location and information about estimated locations of BLE beacons. The locations may be estimated as indicated above with reference to action 405. An area with a low number of observed BLE beacons and/or no proximate BLE beacons may be identified as problematic area. One or more BLE beacons may be missing from this area, or one or more BLE beacons may not be operating any more. In these areas, BLE beacons may be added and/or replaced with new BLE beacons in order to enhance the performance of the system.

The radio image data transmitted by a plurality of BLE beacons in the building may be used by various mobile devices to determine their own position in the building without the need to download a large amount of assistance data via the Internet. A mobile device 320 may simply measure the received signal strengths of transmissions of BLE beacons in the environment, extract the radio image data from the transmissions, and match the measured received signal strength values with the radio image data of one or more BLE beacons. It is to be understood that mobile device 320 does not have to extract and process radio image data repeatedly from the broadcast of the same BLE beacon each time a transmission of this BLE beacon is detected and to be used in positioning computations. Received and processed radio image data may be stored in mobile device 320 for instance for a predetermined period of time or for a predetermined number of BLE beacons 300 that have been detected most recently by mobile device 320.

Figure 12:
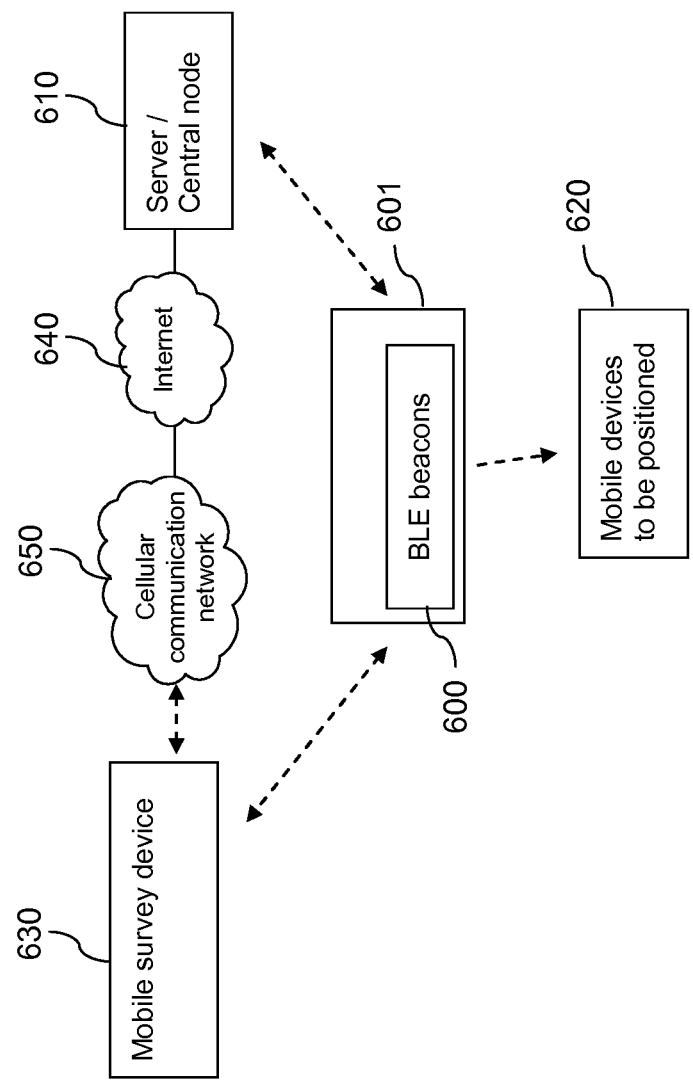
FIG. 12 is a schematic block diagram of a further example embodiment of a system comprising an example embodiment of an apparatus according to the first aspect and an example embodiment of an apparatus according to the second aspect.

FIG. 12 is a schematic block diagram of another example embodiment of a system supporting a configuration of positioning support devices, the system making use of example embodiments of both aspects of the invention.

The system comprises a plurality of BLE beacons 600, a server 610 and mobile devices 620 that may desire to determine their own position. Server 610 may be a server that is provided as a central node for a specific building, and it may be enabled to communicate with BLE beacons 600 using BLE radio signals.

The system may comprise in addition at least one mobile survey device 630. Server 610 may be enabled to communicate with other devices via the Internet 640. Mobile survey device 630 may be enabled to communicate with servers that are accessible via the Internet 640 using a cellular communication network 650 connected to the Internet 640. Cellular communication network 650 may be any kind of cellular communication network, like a Global System for Mobile Communications (GSM), a CDMA2000, a Universal Mobile Telecommunications System (UMTS), or a long term evolution (LTE) based communication network. It is to be understood that alternatively or in addition, mobile survey device 630 may be enabled to use a wireless local area network (WLAN) for communicating with server 610 via the Internet 640.

Operations in the system of FIG. 12 may be similar to some of the operations in the system of FIG. 5, and these operations may be split up between server 610 and mobile survey device 630. The operations of BLE beacons 600 may be basically the same as described with reference to actions 510 to 506. Once a survey agent has distributed BLE beacons 600 at a site, server 610 may be informed. Server 610 may then provide default configuration parameter values to the beacons 600 using a BLE transmission. The same default configuration parameter values may be used for all BLE beacons 600 (for instance those described with reference to action 401) so that the values may be provided by server 610 in a broadcast. Alternatively, an individual connection may be established subsequently with all beacons 600; in this case it may also be possible to use individual default configuration parameter values, e.g. individual transmission power values. Thereafter, mobile survey device 630 detects broadcast advertising packets of various beacons 600 while moving around (e.g. as described with reference to action 402). Mobile survey device 630 may assembles radio image data for each beacon 600 (e.g. as described with reference to action 404) and provide the radio image data to server 610; alternatively, mobile survey device 630 may provide the original measurement results and measurement location information to server 610, which may then assemble radio image data in the same manner for each beacon 600. Either mobile survey device 630 or server 610 may further determine adapted configuration parameter values for each beacon (e.g. as described with reference to action 404). If determined by mobile survey device 630, the values may be provided as well to server 610. Server 610 may then subsequently establish a BLE connection with each of BLE beacons 600 and cause BLE beacons 600 to store the beacon specific radio mode data as advertising data and to set internal parameter values to correspond to the (optionally beacon specific) adapted configuration parameter values (similarly as described with reference to actions 409 and 410).

Later updates that are based on a testing of the system by means of a mobile survey device 630 (e.g. as described with reference to action 413) may equally be performed via server 610.

Alternatively, each of BLE beacons 600 may be integrated in a device 601 that comprises a further communication interface. Server 610 may then be enabled to communicate with BLE beacons 600 for instance via a local area network (LAN) or a WLAN of the building instead of a BLE radio interface. Alternatively, server 610 may be a general service providing server and may be enabled to access devices 601 via the Internet 630.

It is to be understood that the presented example systems, apparatuses and operations may be varied in many ways. The operations may be varied for instance by modifying actions, by omitting actions and/or by adding actions. In addition, the order of actions may be modified.

In an alternative embodiment, the positioning support devices may include for example other transmitters than BLE beacons, for example regular Bluetooth transmitters or ultra-sound transmitters, etc.

In an alternative embodiment, the location of measurement may be determined for example by other means than user input or GNSS based positioning, for instance using a WLAN based positioning.

In an alternative embodiment, the system may rely largely on BLE beacons that are already available at a localization site. Only as far as the BLE beacons are distributed too sparsely, additional BLE beacons may be used for supplementing the existing infrastructure.

Summarized, certain embodiments of the invention provide for a self-contained positioning system which may not require any Internet connectivity for positioning. Certain embodiments of the invention enable a positioning of mobile devices with very small memory, like IoT devices. In a training phase, data on radio images generated by transmissions of positioning support devices may be assembled, and in a positioning phase, the data on its own radio image may be distributed by each positioning support devices. Thus, additional servers to distribute data about radio images to mobile devices may not be required. For the training phase, there is also no need to print and apply labels indicating the location of each positioning support devices, and no need to position the positioning support devices exactly at the indicated locations so that no detailed map of the building is required.

Furthermore, certain embodiments of the invention provide for an adjustable configuration of positioning support devices for two stages of a self-contained positioning system. Adjusting the configuration of each positioning support device to the environment may maximize the positioning performance. It may be ensured, for instance, that the data of a suitable number of positioning support devices may be received at each location by setting the transmission power to a suitable value. It may be ensured, for instance, that the data of whole radio images of surrounding positioning support devices can be received within a specified period of time by setting the transmission frequency to a suitable value. Using different configurations in different stages of a self-contained positioning system may reduce the overall cost of the system and improve the performance. Using a proper configuration at each stage may increase the life time of the system without making any compromise in performance of the system.

Furthermore, certain embodiments of the invention may help in setting up a self-contained positioning system, if the configuration is performed by means of a mobile device. They may support/guide a user of the mobile device in visiting all positioning support devices for the configuration of the positioning support devices, and thus reduce the possibility of errors in configuring positioning support devices or the likelihood that some positioning support devices are overlooked for configuration, and they may save time in setting up the system. Certain embodiments may also allow checking whether the configuration of a positioning support device was successful by receiving and checking data that is transmitted by a configured positioning support device.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 13:
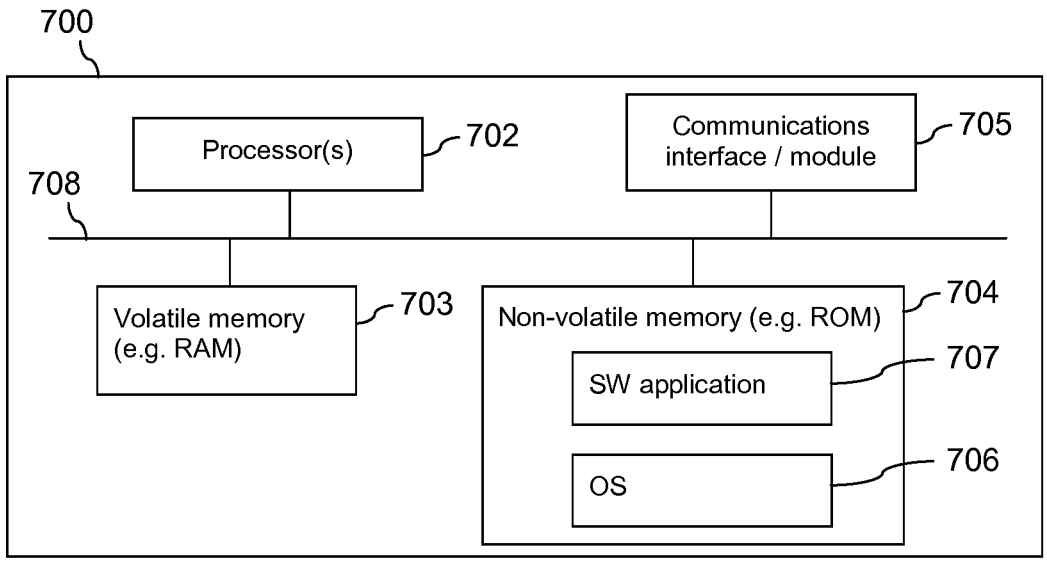
FIG. 13 is a schematic block diagram of an example embodiment of an apparatus.
Figure 14:
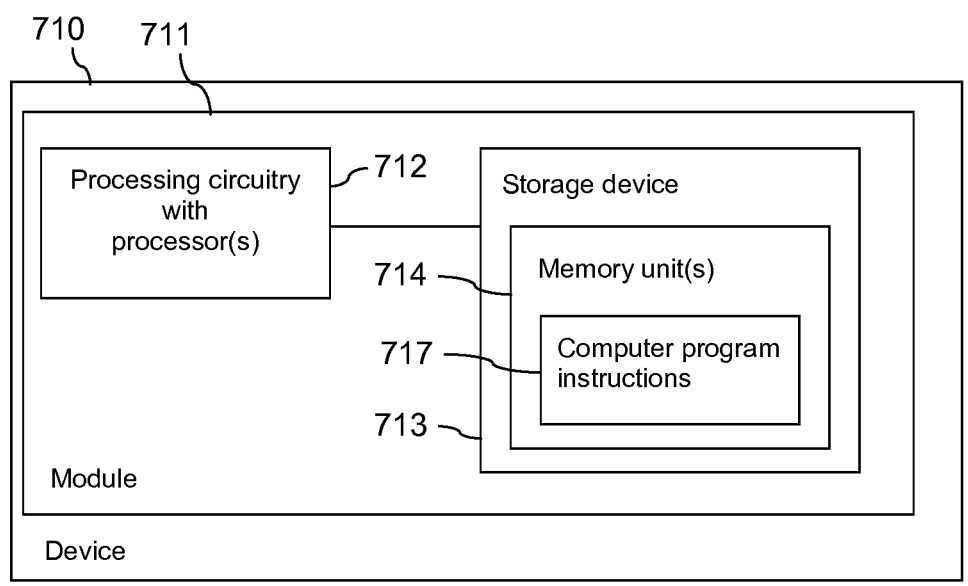
FIG. 14 is a schematic block diagram of an example embodiment of an apparatus.

Example embodiments using at least one processor and at least one memory as a non-transitory data medium are shown in FIGS. 13 and 14.

FIG. 13 is a schematic block diagram of a device 700. Device 700 includes a processor 702. Processor 702 is connected to a volatile memory 703, such as a RAM, by a bus 708. Bus 708 also connects processor 702 and RAM 703 to a non-volatile memory 704, such as a ROM. A communications interface or module 705 is coupled to bus 708, and thus also to processor 702 and memories 703, 704. Within ROM 704 is stored a software (SW) application 707. Software application 707 may be a positioning application, although it may take some other form as well. An operating system (OS) 706 also is stored in ROM 704.

FIG. 14 is a schematic block diagram of a device 710. Device 710 may take any suitable form. Generally speaking, device 710 may comprise processing circuitry 712, including one or more processors, and a storage device 713 comprising a single memory unit or a plurality of memory units 714. Storage device 713 may store computer program instructions 717 that, when loaded into processing circuitry 712, control the operation of device 710. Generally speaking, also a module 711 of device 710 may comprise processing circuitry 712, including one or more processors, and storage device 713 comprising a single memory unit or a plurality of memory units 714. Storage device 713 may store computer program instructions 717 that, when loaded into processing circuitry 712, control the operation of module 711.

The software application 707 of FIG. 13 and the computer program instructions 717 of FIG. 14, respectively, may correspond e.g. to the computer program code in any of memories 102, 202, 302 or 312, respectively.

Figure 15:
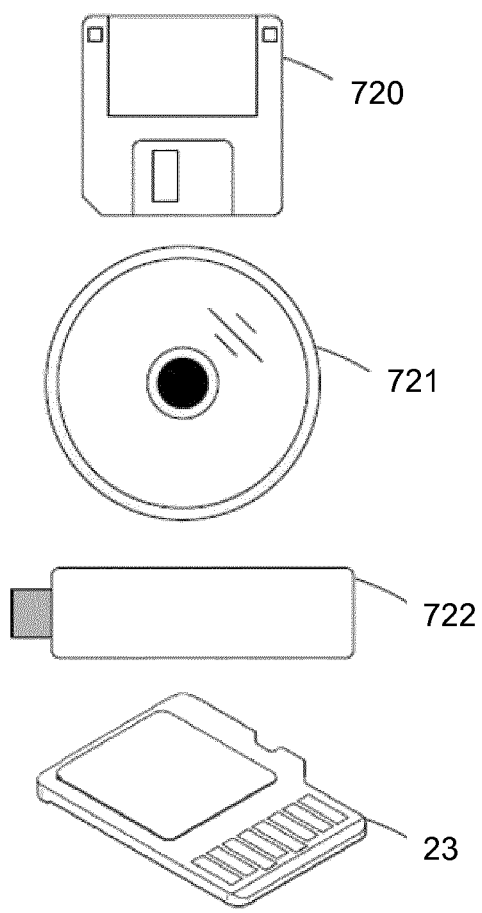
FIG. 15 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 15, which presents, from top to bottom, schematic diagrams of a magnetic disc storage 720, of an optical disc storage 721, of a semiconductor memory circuit device storage 722 and of a Micro-SD semiconductor memory card storage 723.

The functions illustrated by processor 101 in combination with memory 102, or processor 301 in combination with memory 302, or component 303 can also be viewed as means for causing transmission of radio signals using at least one default configuration parameter value; means for obtaining and causing storage of data which enables a determination of characteristics of radio signals transmitted by the positioning support device, wherein the characteristics of radio signals are expected to be observable at different locations; means for obtaining at least one adapted configuration parameter value; and means for causing transmission of radio signals including the stored data using the at least one adapted configuration parameter value.

The program codes in memory 102 and memory 302 can also be viewed as comprising such means in the form of functional modules.

The functions illustrated by processor 201 in combination with memory 202, or processor 311 in combination with memory 312, or component 313 can also be viewed as means for obtaining characteristics of radio signals, the radio signals transmitted by a positioning support device using at least one default configuration parameter value and the characteristics of radio signals measured by at least one mobile device at each of a plurality of locations, and obtaining indications of the locations of measurement; means for assembling, based on the obtained characteristics of radio signals and the obtained indications of the locations of measurement, data which enables a determination of characteristics of radio signals transmitted by the positioning support device, wherein the characteristics of radio signals are expected to be observable at different locations; means for determining at least one adapted configuration parameter value for the positioning support device; and means for causing the positioning support device to store the assembled data for future transmissions and to use the at least one adapted configuration parameter value for future transmissions.

The program codes in memory 202 and memory 312 can also be viewed as comprising such means in the form of functional modules.

Figure 6A:
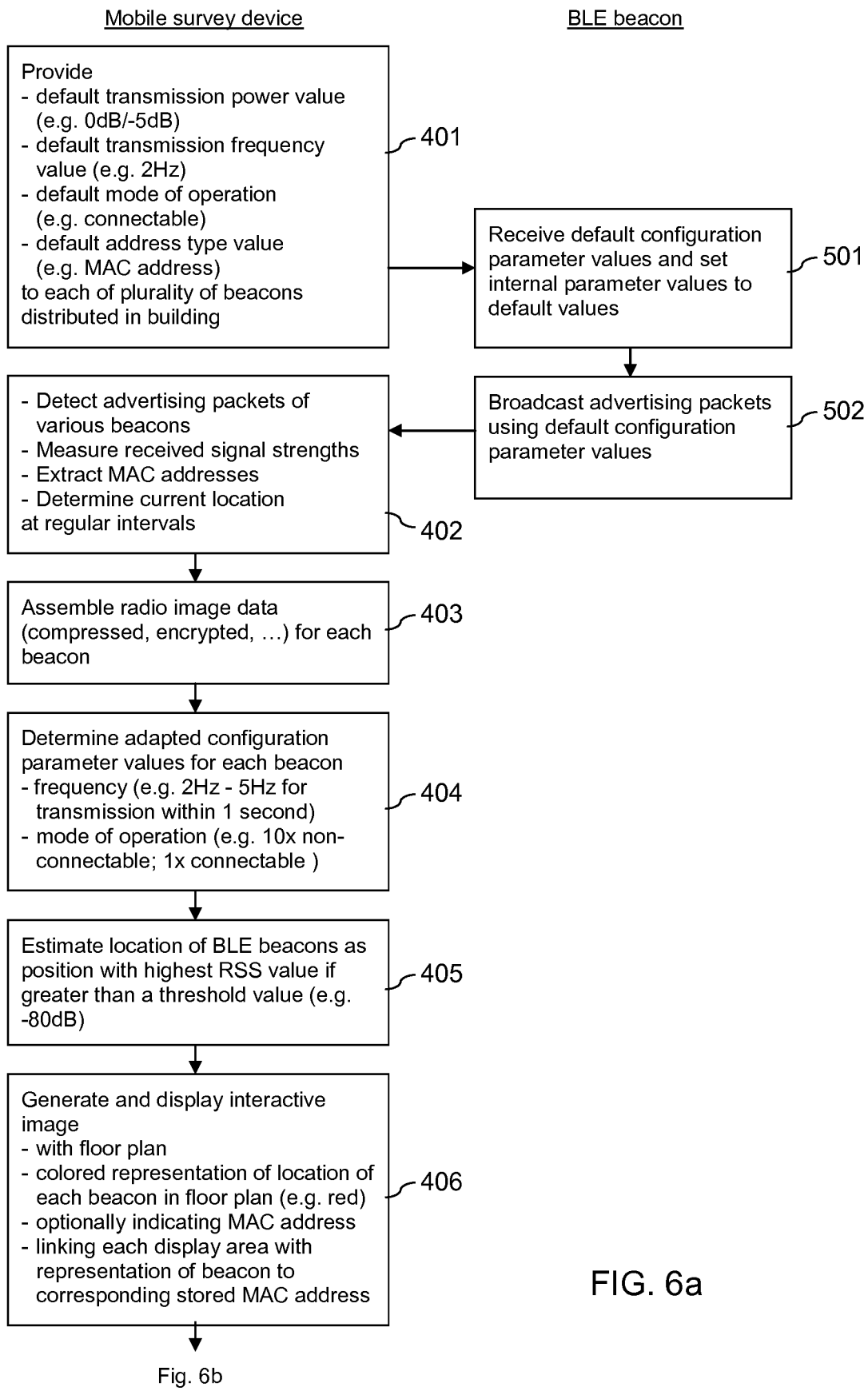
FIG. 6*a/b* is a flow chart illustrating an example embodiment of operations in the system of FIG. 5.
Figure 6B:
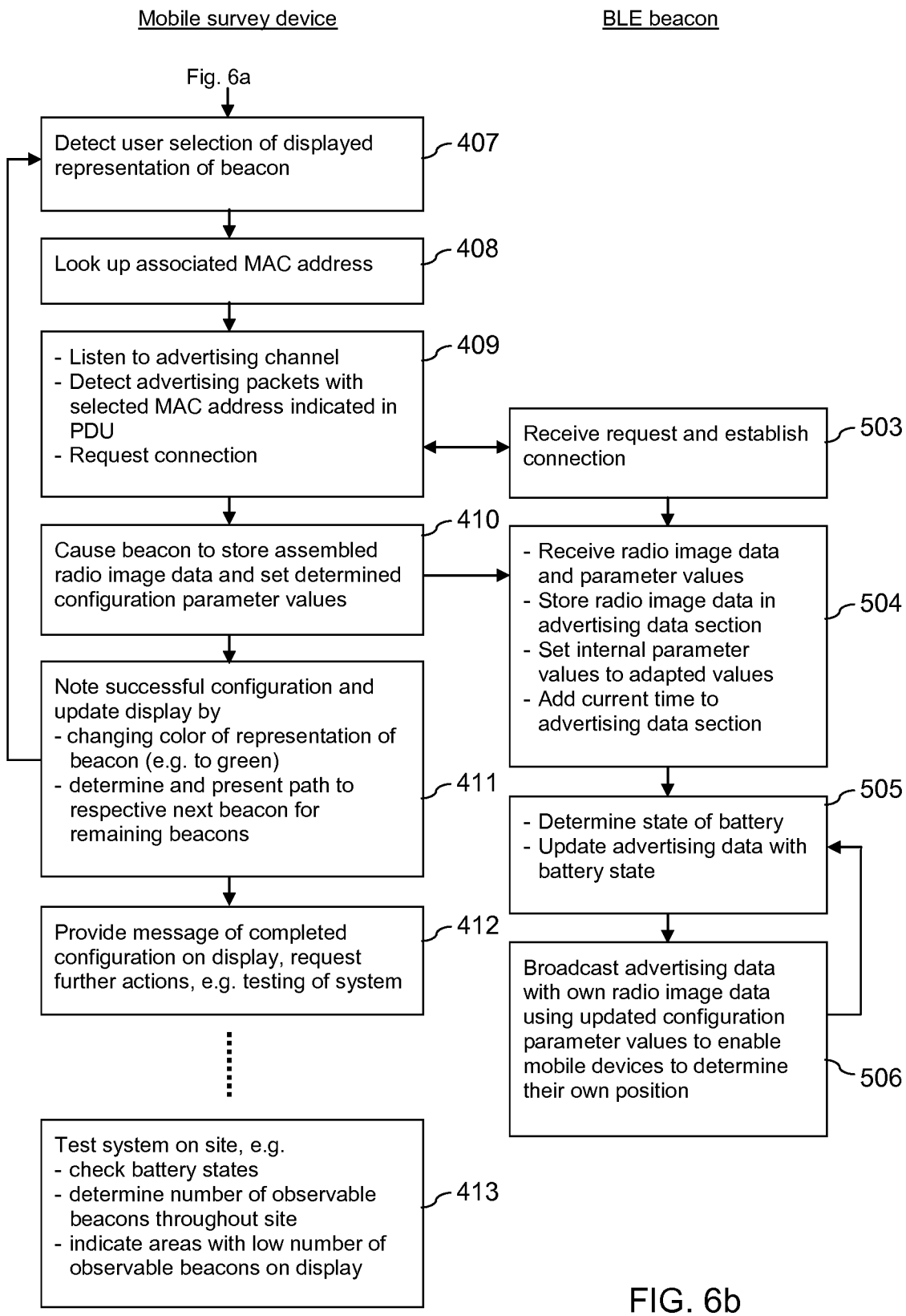

FIGS. 2, 4 and 6a/b may also be understood to represent example functional blocks of computer program codes supporting a positioning of a mobile device by the mobile device.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

The invention claimed is:
1. A method comprising:
transmitting, by a positioning support device, radio signals using at least one default configuration parameter value;
obtaining and storing, by the positioning support device, data defining a radio image that associates observable characteristics of radio signals transmitted by the positioning support device with different locations, wherein the characteristics of the radio signals relate to received signal strength, wherein the at least one default configuration parameter value is used in transmissions of the positioning support device prior to the obtaining and storing of data which enables a determination of the characteristics of radio signals;

obtaining, by the positioning support device, at least one adapted configuration parameter value, wherein the at least one adapted configuration parameter value is used in transmissions by the positioning support device after the obtaining and storing of data which enables a determination of characteristics of radio signals, wherein the at least one default configuration parameter value and at least one adapted configuration parameter value are parameters that effect a manner in which the positioning support device transmits the radio signals, and wherein the parameters include a transmission frequency value or a value relating to a mode of operation; and transmitting, by the positioning support device, radio signals including the stored data defining the radio image using the at least one adapted configuration parameter value, wherein in an instance in which the at least one adapted configuration parameter comprises the transmission frequency value, the transmission frequency value is such that the radio image is capable of being transmitted by the positioning support device within a specified period of time, and wherein in an instance in which the at least one adapted configuration parameter comprises the value relating to the mode of operation, the value relating to the mode of operation is such that the mode of operation comprises an interleaving of a connectable mode and a non-connectable mode.

2. The method according to claim 1, wherein at least one of the following constellations applies:

the method further comprises obtaining, by the positioning support device, the at least one default configuration parameter value; and/or receiving, by the positioning support device, radio signals comprising the at least one default configuration parameter value; and/or receiving, by the positioning support device, radio signals comprising the data which enables a determination of characteristics of radio signals transmitted by the positioning support device; and/or receiving, by the positioning support device, radio signals comprising the at least one adapted configuration parameter value; and/or wherein the at least one default configuration parameter value comprises at least one value relating to the mode of operation, which indicates that the positioning support device is to support a connection to the positioning support device in response to transmissions of the positioning support device; and/or the method further comprises determining and transmitting along with the stored data information about a state of the positioning support device; and/or information about a battery state of the positioning support device; and/or information about a point of time at which the positioning support device obtained the stored data.

3. The method according to claim 1, wherein at least one of the following constellations applies;

the positioning support device is or comprises a Bluetooth beacon; and/or a Bluetooth beacon enabling Bluetooth low energy mode; and/or a Bluetooth low energy beacon; and/or the stored data is transmitted in a broadcast; and/or as advertising data; and/or as advertising data in at least one air interface packet; and/or using at least one advertising channel; and/or using at least one advertising channel that is provided for broadcasts.

4. The method according to claim 1, wherein in an instance in which the at least one adapted configuration parameter comprises the transmission frequency value, the transmission frequency value is dependent upon a size of the radio image.

5. A method, performed by at least one apparatus, the method comprising:

obtaining characteristics of radio signals, the radio signals transmitted by a positioning support device using at least one default configuration parameter value and the characteristics of radio signals measured by at least one mobile device at each of a plurality of locations, and obtaining indications of the locations of measurement;

assembling, based on the obtained characteristics of radio signals and the obtained indications of the locations of measurement, data defining a radio image that associates observable characteristics of radio signals transmitted by the positioning support device with different locations, wherein the characteristics of the radio signals relate to received signal strength, wherein the at least one default configuration parameter value is used in transmissions of the positioning support device prior to the assembling of data which enables a determination of the characteristics of radio signals;

determining at least one adapted configuration parameter value for the positioning support device, wherein the at least one adapted configuration parameter value is used in transmissions by the positioning support device after the assembling of data which enables a determination of characteristics of radio signals, wherein the at least one default configuration parameter value and at least one adapted configuration parameter value are parameters that effect a manner in which the positioning support device transmits the radio signals, and wherein the parameters include a transmission frequency value or a value relating to a mode of operation; and causing the positioning support device to store the assembled data defining the radio image for future transmissions and to use the at least one adapted configuration parameter value for future transmissions, wherein in an instance in which the at least one adapted configuration parameter comprises the transmission frequency value, the transmission frequency value is such that the radio image is capable of being transmitted by the positioning support device within a specified period of time, and wherein in an instance in which the at least one adapted configuration parameter comprises the value relating to the mode of operation, the value relating to the mode of operation is such that the mode of operation comprises an interleaving of a connectable mode and a non-connectable mode.

6. The method according to claim 5, wherein the at least one default configuration parameter value comprises at least one value relating to the mode of operation, which indicates that the positioning support device is to support a connection to the positioning support device in response to transmissions of the positioning support device.

7. The method according to claim 5, wherein the at least one apparatus is or belongs to a mobile device, the method further comprising:
  detecting radio signals transmitted by a plurality of positioning support devices in order to obtain the characteristics of radio signals for the plurality of positioning support devices and identifications of the plurality of positioning support devices;
  estimating a position of each of the plurality of positioning support devices and storing an indication of the estimated positions along with the obtained identifications of the positioning support devices; and
  causing the mobile device to display a representation of the positioning support devices on a display with a spatial distribution corresponding to the estimate positions.

8. The method according to claim 7, wherein at least one of the following constellations applies:
  the representation of each positioning support device is linked to the stored identification of the represented positioning support device, the method further comprising detecting a user selection of a displayed representation of a positioning support device; determining the stored identification of the positioning support device that is linked to the selected representation of the positioning support device; establishing a connection with the positioning support device using the determined identification; and using the established connection for causing the positioning support device to store the assembled data for future transmissions and to set the at least one adapted configuration parameter value for use for future transmissions; and/or
  the method further comprises estimating a position of a positioning support device comprises determining a location at which a highest signal strength has been received from the positioning support device and using the location as estimated position; or determining a location at which a highest signal strength has been received from the positioning support device, and using the location as estimated position in case the highest signal strength exceeds a predetermined threshold; and/or
  the method further comprises determining a path between the representations of the positioning support devices on the display; and causing the mobile device to display the path on the display for guiding the user; and/or
  the method further comprises causing a marking of the representations of the positioning support devices on the display that have been successfully configured.

9. The method according to claim 5, further comprising at least one of:
  causing the mobile device to display information relating to a state of configured positioning support devices; and
  causing the mobile device to display information relating to a coverage achieved with configured positioning support devices.

10. The method according to claim 5, wherein at least one of the following constellations applies:
  at least one of the plurality of positioning support devices is or comprises a Bluetooth beacon; and/or a Bluetooth beacon enabling Bluetooth low energy mode; and/or a Bluetooth low energy beacon; and/or
  the stored data is transmitted in a broadcast; and/or as advertising data; and/or as advertising data in at least one air interface packet; and/or using at least one advertising channel; and/or using at least one advertising channel that is provided for broadcasts.

11. An apparatus comprising at least one processor and at least one memory including computer program code, the at least one memory and the computer program code configured to, with the at least one processor, cause a positioning support device at least to perform:
  transmit radio signals using at least one default configuration parameter value;
  obtain and store data defining a radio map that associates observable characteristics of radio signals transmitted by the positioning support device with different locations, wherein the characteristics of the radio signals relate to received signal strength, wherein the at least one default configuration parameter value is used in transmissions of the positioning support device prior to the obtaining and storing of data which enables a determination of the characteristics of radio signals;
  obtain at least one adapted configuration parameter value, wherein the at least one adapted configuration parameter value is used in transmissions by the positioning support device after the obtaining and storing of data which enables a determination of characteristics of radio signals, wherein the at least one default configuration parameter value and at least one adapted configuration parameter value are parameters that effect a manner in which the positioning support device transmits the radio signals, and wherein the parameters include a transmission frequency value or a value relating to a mode of operation; and
  transmit radio signals including the stored data defining the radio image using the at least one adapted configuration parameter value,
  wherein in an instance in which the at least one adapted configuration parameter comprises the transmission frequency value, the transmission frequency value is such that the radio image is capable of being transmitted by the positioning support device within a specified period of time, and
  wherein in an instance in which the at least one adapted configuration parameter comprises the value relating to the mode of operation, the value relating to the mode of operation is such that the mode of operation comprises an interleaving of a connectable mode and a non-connectable mode.

12. The apparatus according to claim 11, wherein the at least one memory and the computer program code are configured to, with the at least one processor, further cause the positioning support device to at least one of:
  obtain the at least one default configuration parameter value;
  receive radio signals comprising the at least one default configuration parameter value;
  receive radio signals comprising the data which enables a determination of the characteristics of radio signals transmitted by the positioning support device; and
  receive radio signals comprising the at least one adapted configuration parameter value.

13. The apparatus according to claim 11, wherein the at least one default configuration parameter value comprises at least one value relating to the mode of operation, which indicates that the positioning support device is to support a connection to the positioning support device in response to transmissions of the positioning support device.

14. The apparatus according to claim 11, wherein the at least one memory and the computer program code are configured to, with the at least one processor, further cause the positioning support device to determine and transmit along with the stored data at least one of:

information about a state of the positioning support device;
information about a battery state of the positioning support device; and
information about a point of time at which the positioning support device obtained the stored data.

15. The apparatus according to claim 11, wherein one of the following constellations applies:
the stored data is transmitted in a broadcast; and/or as advertising data; and/or as advertising data in at least one air interface packet; and/or using at least one advertising channel; and/or using at least one advertising channel that is provided for broadcasts; and/or
the apparatus is a chip; or a module for a positioning support device; or a positioning support device; or a Bluetooth beacon; or a Bluetooth beacon enabling Bluetooth low energy mode; or a Bluetooth low energy beacon.

16. An apparatus comprising at least one processor and at least one memory including computer program code, the at least one memory and the computer program code configured to, with the at least one processor, cause an apparatus at least to perform:
obtain characteristics of radio signals, the radio signals transmitted by a positioning support device using at least one default configuration parameter value and the characteristics of radio signals measured by at least one mobile device at each of a plurality of locations, and obtain indications of the locations of measurement;
assemble, based on the obtained characteristics of radio signals and the obtained indications of the locations of measurement, data defining a radio image that associates observable characteristics of radio signals transmitted by the positioning support device with different locations, wherein the characteristics of the radio signals relate to received signal strength, wherein the at least one default configuration parameter value is used in transmissions of the positioning support device prior to the assembling of data which enables a determination of the characteristics of radio signals;
determine at least one adapted configuration parameter value for the positioning support device, wherein the at least one adapted configuration parameter value is used in transmissions by the positioning support device after the assembling of data which enables a determination of characteristics of radio signals, wherein the at least one default configuration parameter value and at least one adapted configuration parameter value are parameters that effect a manner in which the positioning support device transmits the radio signals, and wherein the parameters include a transmission frequency value or a value relating to a mode of operation; and
cause the positioning support device to store the assembled data defining the radio image for future transmissions and to use the at least one adapted configuration parameter value for future transmissions,
wherein in an instance in which the at least one adapted configuration parameter comprises the transmission frequency value, the transmission frequency value is such that the radio image is capable of being transmitted by the positioning support device within a specified period of time, and
wherein in an instance in which the at least one adapted configuration parameter comprises the value relating to the mode of operation, the value relating to the mode of operation is such that the mode of operation comprises an interleaving of a connectable mode and a non-connectable mode.

17. The apparatus according to claim 16, wherein the at least one default configuration parameter value comprises at least one value relating to the mode of operation, which indicates that the positioning support device is to support a connection to the positioning support device in response to transmissions of the positioning support device.

18. The apparatus according to claim 16, wherein the at least one apparatus is or belongs to a mobile device and wherein the at least one memory and the computer program code are further configured to, with the at least one processor, cause the mobile device to:
detect radio signals transmitted by a plurality of positioning support devices in order to obtain the characteristics of radio signals for the plurality of positioning support devices and identifications of the plurality of positioning support devices;
estimate a position of each of the plurality of positioning support devices and storing an indication of the estimated positions along with the obtained identifications of the positioning support devices; and
display a representation of the positioning support devices on a display with a spatial distribution corresponding to the estimate positions.

19. The apparatus according to claim 18, wherein the representation of each positioning support device is linked to the stored identification of the represented positioning support device, and wherein the at least one memory and the computer program code are further configured to, with the at least one processor, cause the mobile device to:
detect a user selection of a displayed representation of a positioning support device;
determine the stored identification of the positioning support device that is linked to the selected representation of the positioning support device;
establish a connection with the positioning support device using the determined identification; and
use the established connection for causing the positioning support device to store the assembled data for future transmissions and to set the at least one adapted configuration parameter value for use for future transmissions.

20. The apparatus according to claim 18, wherein estimating a position of a positioning support device comprises one of:
determining a location at which a highest signal strength has been received from the positioning support device and using the location as estimated position; and
determining a location at which a highest signal strength has been received from the positioning support device, and using the location as estimated position in case the highest signal strength exceeds a predetermined threshold.

21. The apparatus according to claim 18, wherein the at least one memory and the computer program code are further configured to, with the at least one processor, cause the mobile device to:
determine a path between the representations of the positioning support devices on the display; and
display the path on the display for guiding the user.

22. The apparatus according to claim 18, wherein the at least one memory and the computer program code are further configured to, with the at least one processor, cause the mobile device to:

cause a marking of the representations of the positioning support devices on the display that have been successfully configured.

23. The apparatus according to claim 16, wherein the at least one memory and the computer program code are further configured to, with the at least one processor, cause the mobile device to:
  display information relating to a state of configured positioning support devices; and
  display information relating to a coverage achieved with configured positioning support devices.

24. The apparatus according to claim 16, wherein at least one of the following constellations applies:
  at least one of the plurality of positioning support devices is or comprises a Bluetooth beacon; and/or a Bluetooth beacon enabling Bluetooth low energy mode; and/or a Bluetooth low energy beacon; and/or
  the radio signals transmitted by each of the plurality of positioning support devices are transmitted in a broadcast; and/or as advertising data; and/or as advertising data in at least one air interface packet; and/or using at least one advertising channel; and/or using at least one advertising channel that is provided for broadcasts.

25. A non-transitory computer readable storage medium in which computer program code is stored, the computer program code causing an apparatus to perform the following when executed by a processor:
  transmit radio signals using at least one default configuration parameter value;
  obtain and store data defining a radio image that associates observable characteristics of radio signals transmitted by the positioning support device with different locations, wherein the characteristics of the radio signals relate to received signal strength, wherein the at least one default configuration parameter value is used in transmissions of the positioning support device prior to the obtaining and storing of data which enables a determination of the characteristics of radio signals;
  obtain at least one adapted configuration parameter value, wherein the at least one adapted configuration parameter value is used in transmissions by the positioning support device after the obtaining and storing of data which enables a determination of characteristics of radio signals, wherein the at least one default configuration parameter value and at least one adapted configuration parameter value are parameters that effect a manner in which the positioning support device transmits the radio signals, and wherein the parameters include a transmission frequency value or a value relating to a mode of operation; and
  transmit radio signals including the stored data defining the radio image using the at least one adapted configuration parameter value,
  wherein in an instance in which the at least one adapted configuration parameter comprises the transmission frequency value, the transmission frequency value is such that the radio image is capable of being transmitted by the positioning support device within a specified period of time, and
  wherein in an instance in which the at least one adapted configuration parameter comprises the value relating to the mode of operation, the value relating to the mode of operation is such that the mode of operation comprises an interleaving of a connectable mode and a non-connectable mode.

26. A non-transitory computer readable storage medium in which computer program code is stored, the computer program code causing an apparatus to perform the following when executed by a processor:
  obtain characteristics of radio signals, the radio signals transmitted by a positioning support device using at least one default configuration parameter value and the characteristics of radio signals measured by at least one mobile device at each of a plurality of locations, and obtain indications of the locations of measurement;
  assemble, based on the obtained characteristics of radio signals and the obtained indications of the locations of measurement, data defining a radio image that associates observable characteristics of radio signals transmitted by the positioning support device with different locations, wherein the characteristics of the radio signals relate to received signal strength, wherein the at least one default configuration parameter value is used in transmissions of the positioning support device prior to the assembling of data which enables a determination of the characteristics of radio signals;
  determine at least one adapted configuration parameter value for the positioning support device, wherein the at least one adapted configuration parameter value is used in transmissions by the positioning support device after the assembling of data which enables a determination of characteristics of radio signals, wherein the at least one default configuration parameter value and at least one adapted configuration parameter value are parameters that effect a manner in which the positioning support device transmits the radio signals, and wherein the parameters include a transmission frequency value or a value relating to a mode of operation; and
  cause the positioning support device to store the assembled data defining the radio image for future transmissions and to use the at least one adapted configuration parameter value for future transmissions,
  wherein in an instance in which the at least one adapted configuration parameter comprises the transmission frequency value, the transmission frequency value is such that the radio image is capable of being transmitted by the positioning support device within a specified period of time, and
  wherein in an instance in which the at least one adapted configuration parameter comprises the value relating to the mode of operation, the value relating to the mode of operation is such that the mode of operation comprises an interleaving of a connectable mode and a non-connectable mode.

* * * * *